(12) United States Patent
Sasajima

(10) Patent No.: US 7,740,103 B2
(45) Date of Patent: Jun. 22, 2010

(54) ELECTRIC POWER STEERING APPARATUS

(75) Inventor: Koji Sasajima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 248 days.

(21) Appl. No.: 12/056,874

(22) Filed: Mar. 27, 2008

(65) Prior Publication Data

US 2008/0236934 A1    Oct. 2, 2008

(30) Foreign Application Priority Data

Mar. 27, 2007   (JP)  ............................. 2007-082415

(51) Int. Cl.
    *B62D 5/04*   (2006.01)
(52) U.S. Cl. ...................... 180/443; 180/446
(58) Field of Classification Search ................. 180/443, 180/446; 318/139; 701/41
    See application file for complete search history.

(56) References Cited

U.S. PATENT DOCUMENTS 4,875,539 A * 10/1989 Abukawa et al. ............ 180/446

6,216,814 B1 * 4/2001 Fujita et al. .................. 180/422
7,358,690 B2 * 4/2008 Kifuku ........................ 318/62

FOREIGN PATENT DOCUMENTS

JP    08-127355 A    5/1996

* cited by examiner

*Primary Examiner*—Tony H. Winner

(57) ABSTRACT

When a current input to a step-up voltage device of an electric power steering apparatus is equal to or higher than a first threshold current and an input voltage applied to the step-up voltage device is lower than a first threshold voltage, the step-up voltage device of the electric power steering apparatus discontinuously switches an output voltage to a voltage lower than a rated step-up voltage. When the input voltage becomes lower than a second threshold voltage which is lower than the first threshold voltage, the step-up voltage device sets the output voltage to a voltage equal to the input voltage.

14 Claims, 9 Drawing Sheets

ELECTRIC POWER STEERING APPARATUS

CROSS-REFERENCE TO RELATED APPLICATION(S)

This application claims the foreign priority benefit under Title 35, United States Code, §119 (a)-(d), of Japanese Patent Application No. 2007-082415, filed on Mar. 27, 2007 in the Japan Patent Office, the disclosure of which is herein incorporated by reference in its entirety.

BACKGROUND OF THE INVENTION

1. Field of the Invention

The present invention relates to an electric power steering apparatus in a vehicle.

2. Description of the Related Art

In an electric power steering apparatus, an electric motor generates an assist torque in accordance with a steering torque and transmits the torque to a steering shaft, and thereby reduces the steering torque. Generally, a vehicle of 2000 cc engine requires a current of 60 A or more. Therefore, a voltage higher than a battery voltage of the vehicle is required in order to gain a larger output voltage. An electric power steering apparatus which includes a step-up voltage apparatus for stepping up a battery voltage and drives the motor with a step-up voltage is disclosed. Further, the electric power steering apparatus discloses that, when an input voltage continues to be lower than a predetermined value for a predetermined time, an output voltage is gradually lowered at a predetermined inclination (as shown in JP-H08-127355).

However, a conventional step-up voltage device outputs a uniform step-up voltage (20V) when an input voltage (battery voltage) is in a range of a rated voltage (10 V to 16 V). The device reduces the output voltage at a predetermined inclination when the input voltage is equal to or lower than the range of the rated voltage. Accordingly, even a motor stops and a large mount of current flows, the step-up output voltage continues to be output until the input voltage is out of the range of the rated input voltage. Even if the input voltage is lowered, the output voltage is lowered at the predetermined inclination, which causes the current in the device to be delayed in lowering. Generally speaking, a voltage is likely to drop when a current from a worn-out battery increases. Consequently, when a current from batteries increases and a voltage drops, an electric circuit driven by the battery cannot properly operate. Further, when a large amount of current is taken out of a worn-out battery, the battery is likely to be damaged due to an internal voltage drop.

BRIEF SUMMARY OF THE INVENTION

An object of the present invention is to provide an electric power steering apparatus including a step-up voltage device which controls an output voltage.

In order to solve the problems mentioned above, the electric power steering apparatus of the present invention comprises: a motor providing a steering force; a step-up voltage apparatus which steps up a voltage output by an electric power supply; and a drive control apparatus which drives the motor with a target current based on a steering input by using an output voltage of the step-up voltage apparatus. The drive control apparatus includes: a current monitor apparatus which monitors an input current; and a voltage monitor apparatus which monitors an applied voltage, wherein the step-up voltage apparatus outputs a rated step-up voltage to drive the motor, and wherein, when a current input to the step-up voltage apparatus is equal to or higher than a first threshold current set in the step-up voltage apparatus, and a voltage applied to the step-up voltage apparatus is lower than a first threshold voltage set in the step-up voltage apparatus, the step-up voltage apparatus discontinuously switches the output voltage to a voltage lower than the rated step-up voltage.

According to claim 1 of the present invention, when the current input to the step-up voltage apparatus is equal to or higher than the first threshold current, and the voltage applied to the step-up voltage apparatus becomes lower than the first threshold voltage, the step-up voltage apparatus can discontinuously lower the output voltage.

In claim 2 of the present invention, when the current input to the step-up voltage apparatus is equal to or higher than the first threshold current, and a voltage applied to the step-up voltage apparatus is lower than the first threshold voltage, the step-up voltage apparatus stops the step-up voltage operation.

According to claim 2 of the present invention, when the current input to the step-up voltage apparatus is equal to or higher than the first threshold current, and the voltage applied to the step-up voltage apparatus is lower than the first threshold voltage, the step-up voltage operation of the step-up voltage apparatus can be stopped.

In claim 3 of the present invention, the step-up voltage apparatus sets a predetermined second threshold voltage which is lower than the first threshold voltage and outputs the rated step-up voltage. When the current input to the step-up voltage apparatus is lower than the first threshold current, and the voltage applied to the step-up voltage apparatus is lower than the second threshold voltage, the step-up voltage apparatus discontinuously switches an output voltage to a voltage which is lower than the rated step-up voltage.

According to claim 3 of the present invention, when the current input to the step-up voltage apparatus is lower than the first threshold current, and the voltage applied to the step-up voltage apparatus is lower than the second threshold voltage, the step-up voltage apparatus discontinuously lowers the output voltage.

In claim 4 of the present invention, when the current input to the step-up voltage apparatus is lower than the first threshold current, and the voltage applied to the step-up voltage apparatus is lower than the second threshold voltage, the step-up voltage apparatus stops the step-up voltage operation.

According to claim 4 of the present invention, when the current input to the step-up voltage apparatus is lower than the first threshold current, and the voltage applied to the step-up voltage apparatus is lower than the second threshold voltage, the step-up voltage operation of the step-up voltage apparatus can be stopped.

In claim 5 of the present invention, the step-up voltage apparatus sets a predetermined second threshold current which is higher than the first threshold current. When the current input to the step-up voltage apparatus is equal to or higher than the second threshold current, and the voltage applied to the step-up voltage apparatus is lower than the first threshold voltage, the step-up voltage apparatus stops the step-up voltage operation.

According to claim 5 of the present invention, when the current input to the step-up voltage apparatus is higher than the second threshold current, and the voltage applied to the step-up voltage apparatus is lower than the first threshold voltage, the step-up voltage operation of the step-up voltage apparatus can be stopped.

An electric power steering apparatus of the present invention can prevent a battery from deteriorating, wherein a drop of the current is immediately lowered by swiftly lowering an output voltage, and an input voltage drop resulting from the current increased is kept in check.

The electric power steering apparatus can limit an increase in a workload (power consumption) of a vehicle as a whole, wherein a load of the battery is kept in check.

DETAILED DESCRIPTION OF PREFERRED EMBODIMENTS

Preferred embodiments of the present invention will be described with reference to the accompanying drawings as needed.

First Embodiment

Figure 1:
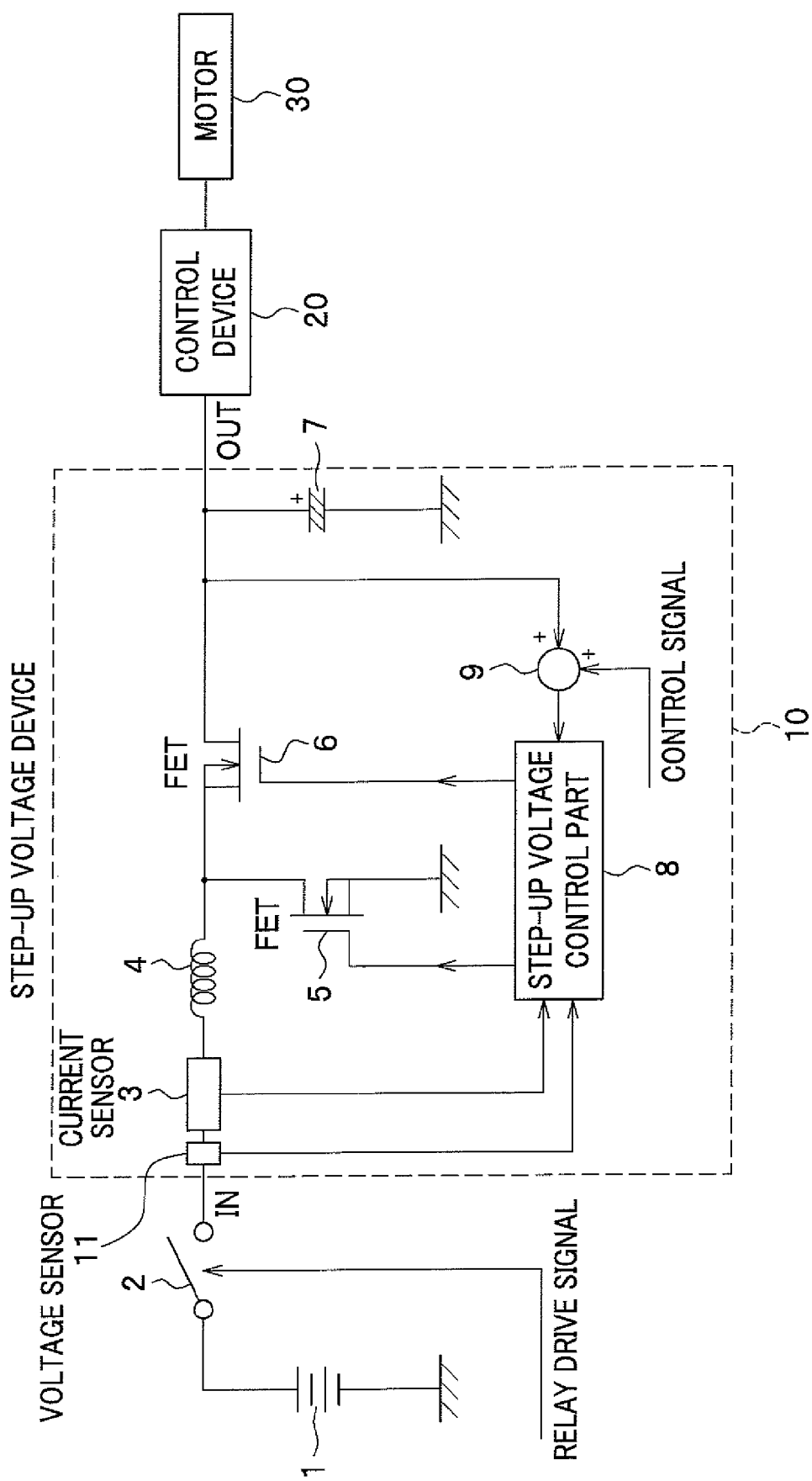
FIG. 1 is a block diagram illustrating a step-up voltage device of an electric power steering apparatus of the present invention.

FIG. 1 shows a block diagram illustrating a step-up voltage device of the present invention.

Figure 2:
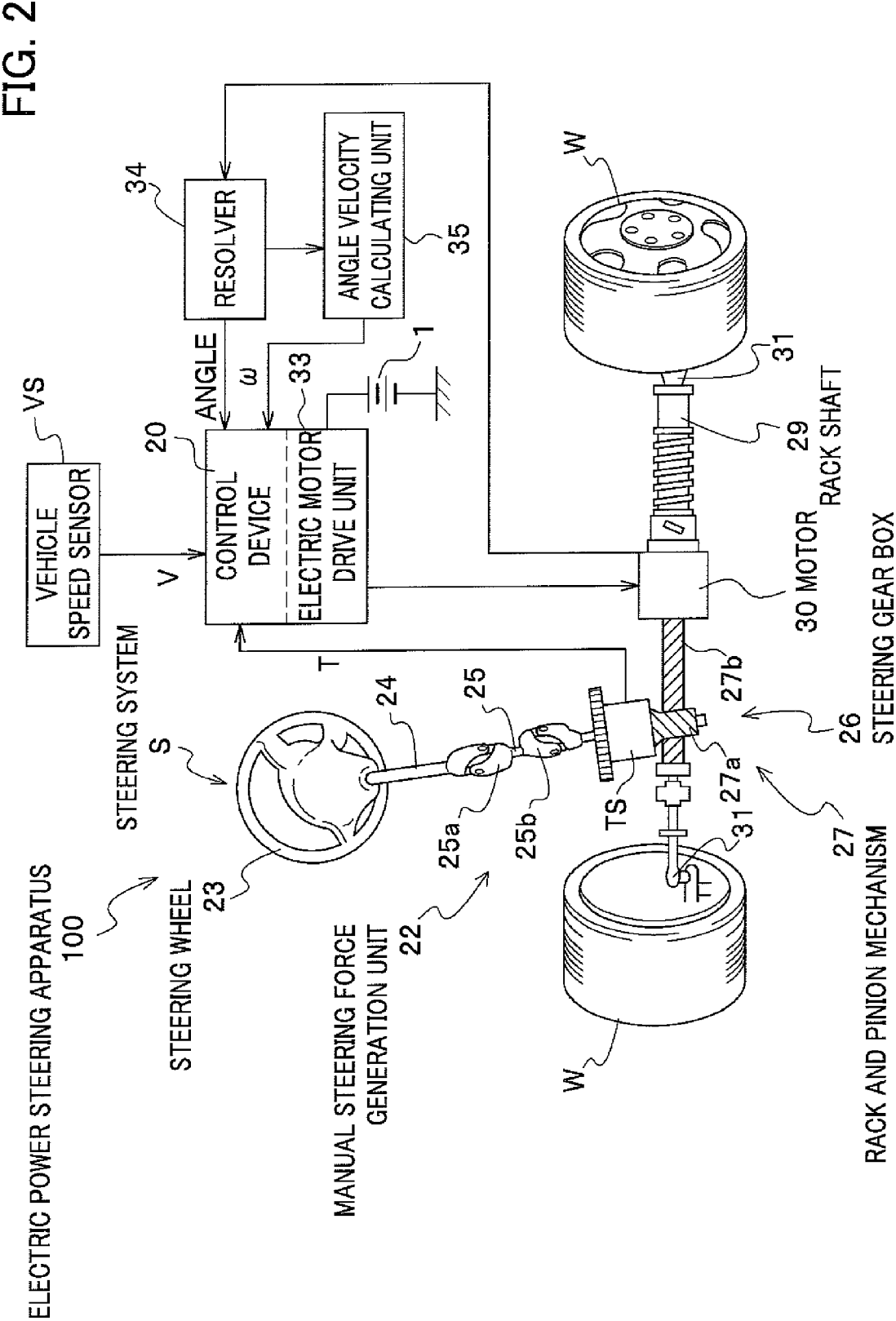
FIG. 2 is a configuration drawing of the electric power steering apparatus.

A battery 1 of a power supply is connected with an input terminal In of a step-up voltage device 10 (step-up voltage apparatus) via a relay 2. An output terminal of the step-up voltage device 10 is connected with a motor 30 via a Field Effect Transistor (FET) bridge circuit installed in an electric motor drive apparatus 33 built in a control device 20 (FIG. 2). A rated voltage of the battery 1 is 12 V. A load current resulting from an internal resistance causes the output voltage of the battery 1 to fluctuate in a range of 0 to 14 V. The battery 1 is connected with an alternating current generator (not shown) which rectifies a generated alternating voltage and charges the battery 1. The relay 2 is ON-OFF controlled by a relay drive signal. A relay drive signal is linked together with an On-Off operation of an ignition not shown. It is assumed that the relay 2 is turned on (conducted) when the ignition is turned on.

The input terminal In of the step-up voltage device 10 is connected with a voltage sensor 11 (voltage monitor apparatus) which is connected with a current sensor 3 (current monitor apparatus). An FET 6 which is a semiconductor switch is connected between the current sensor 3 and an output terminal Out via a coil 4. The FET 6 includes an N-channel Metal Oxide Silicon Field Effect Transistor (MOS-FET). A source terminal of the FET 6 is connected with the coil 4 and a drain terminal is connected with the output terminal Out. The current sensor 3 may include a tiny resistor across which a voltage is applied and detected, or a Hall element which detects a current flowing in a conductor. The voltage sensor 11 may include an A/D converter which converts an analog signal of an input voltage to a digital signal which is input to a step-up voltage control part 8.

An electrolytic capacitor 7 which smoothes an output voltage Vo is connected between ground and the output terminal Out of the step-up voltage device 10. A connection point between the coil 4 and the FET 6 is connected with a drain terminal of an FET 5 which is a N-channel MOS-FET. A source terminal of the FET 5 is grounded.

The step-up voltage control part 8 is connected with the gate terminals of the FETs 5 and 6 on to which a gate voltage is applied. The step-up voltage control part 8 turns on/off the FETs 5 and 6 by controlling the gate voltage on the gate terminals. The step-up voltage control part 8 controls conduction and insulation between the source terminals and the drain terminals of FETs 5 and 6.

A voltage signal of the output terminal Out and output signals of the current sensor 3 and the voltage sensor 11 are input to the part 8 which controls the gate voltages of the FETs 5 and 6. The step-up voltage control part 8 receives a voltage signal of the output terminal, output signals of the current sensor 3 and the voltage sensor 11, and a control signal to which an adder 9 adds the voltage signal of the output terminal Out. Substrates of the FETs 5 and 6 are connected with any one of the drain terminal and the source terminal.

The step-up voltage control part 8 comprises a microprocessor which includes a Central Processing Unit (CPU), a Read-Only Memory (ROM), a Random Access Memory (RAM), a peripheral circuit and the like (not shown). The CPU runs on a program stored in the ROM and controls the step-up voltage device 10 and executes an output of a voltage on the basis of the program.

The CPU receives the signals output by the current sensor 3 and the voltage sensor 11.

Next, an operation of the step-up voltage device 10 will be explained with reference to FIG. 1. When the relay 2 is brought into conduction, an input voltage Vin from the battery 1 is applied to the input terminal In of the step-up voltage device 10. In this time, the step-up voltage control part 8 applies a high electric potential to the gate terminal of the FET 5, whereby the FET is conducted, and shuts off the FET 6 by applying a low electric potential to the gate terminal of the FET 6 by the time Ton passes. Consequently, a current flows through the coil 4 via the voltage sensor 11 and the current sensor 3. The current linearly increases in inverse proportion to an inductance L of the coil 4. The increase in the current is given by an expression (Vin/L)Ton. After the time Ton passes, the step-up voltage control part 8 applies a low voltage to the gate terminal of the FET 5 which is switched off by the time Toff passes, and applies a high voltage to the gate terminal of the FET 6 which is switched on and brought into conduction.

The current linearly decreases in inverse proportion to the inductance of the coil 4 during the time Toff. The decrease in the current is given by an expression (Vo−Vin/L)Toff in which Vo means an output voltage. After the time Toff passes, the step-up voltage control part 8 applies a high voltage to the gate terminal of the FET 5 which is switched on and brought into conduction and applies a low voltage to the gate terminal of the FET 6 which is switched off. In other words, the step-up voltage control part 8 complementally switches the two FETs.

As the increase in the current flown in the FET 5 is equal to the decrease in the current flown in the FET 6 during switching, and the step-up voltage control part 8 alternately switches on/off the FETs 5 and 6, the output voltage converges on a voltage value which is given by an expression (1+Ton/Toff) Vin. In other words, the voltage (Ton/Toff)Vin which is determined by a ratio of on-time to off time of the FETs 5 and 6 is applied to the input voltage Vin input to the input terminal In from the battery 1 and is output from the step-up voltage device 10.

FIG. 2 shows a configuration drawing of an electric power steering apparatus 100 of a first embodiment. A steering shaft 24 integrally installed in a steering wheel 23 is connected with a pinion 27a of a rack and pinion mechanism 27 in a steering gear box 26 via a connecting shaft 25 including universal joints 25a and 25b and constructs a manual steering force generation apparatus 22. A rotational movement of the pinion 27a that meshes with rack teeth 27b is converted into an axial reciprocating movement of a rack shaft 29 which rotates rolling steering wheels W via tie rods 31a and 31b at both ends of the rack shaft 29.

A electric power steering apparatus 100 drives the motor 30 by the electric drive apparatus 33 in the control device 20 to generate an assist torque (assist steering force) and assists a manual steering force generated by the manual steering generating apparatus 22. Mechanical sections including the steering wheel 23, the steering shaft 24, the connecting shaft 25, the rack and pinion mechanism 27, the rack shaft 29, the motor 30, the rolling steering wheels W and the like are collectively called a steering system S.

The control device 20 includes a vehicle speed sensor VS that outputs a vehicle speed signal V, a steering torque sensor TS that outputs a steering torque signal T, a resolver 34 that outputs an angle signal ANGLE. An angle velocity calculating apparatus 35 generates an angle velocity signal ω of the motor 30 by differentiating the angle signal ANGLE. The vehicle speed sensor VS outputs a vehicle speed based on a rotation speed of a gear box as pulses per unit time. The resolver 34 includes a magnetic encoder which detects a magnetic change by a plurality of magnets and may include a potentiometer, a rotary encoder, and the like.

The control device 20 determines a magnitude and direction of a target current applied to the motor 30 on the basis of the vehicle speed signal V, the steering torque signal T, the angle signal ANGLE, and the angle velocity signal ω. The current sensor installed in the electric motor drive apparatus 33 detects a current flowing through the motor 30. The current is controlled to be a desired value by PWM (pulse width modulation control).

The steering torque sensor TS installed in the steering gear box 26 detects a magnitude and direction of a steering torque operated by a driver. The steering torque sensor TS transmits an analog signal corresponding to the magnitude and direction of the detected steering torque as the steering torque signal T to the control device 20. The directions of the steering torque are shown by minus and plus values, the plus value shows the right direction and the minus value shows the left direction.

The electric motor drive apparatus 33 controls a current flowing through the motor 30 via a built-in FET bridge circuit corresponding to a duty ratio of PWM signals. The step-up voltage device 10 is interposed between the battery 1 and the FET bridge circuit installed in the electric motor drive apparatus 33 of the control device 20 which outputs a step-up voltage to drive the motor 30.

Accordingly, the step-up voltage device 10 (FIG. 1) of the electric power steering apparatus 100 (FIG. 2) outputs the output electric power Pout as requested when the motor 30 (FIG. 2) demands more electric power. For example, when a driver turns the steering wheel 23 to a full extent with a vehicle stopping and the electric power Pout requested by the motor 30 is increased, the current I input to the input terminal In of the step-up voltage device 10 increases. Accordingly, the current I output by the battery 1 increases.

In the first embodiment, the step-up voltage device 10 (FIG. 1) detects a current value of the current I increased and controls a step-up voltage to be output on the basis of the current value. The threshold value of the current I input to the input terminal In of the step-up voltage device 10 is shown as a first threshold current Is1, which is determined in advance. Further, a threshold value of the input voltage Vin is shown as a first threshold voltage Vs1, which is determined in advance. A second threshold voltage Vs2 lower than the first threshold voltage Vs1 is also determined in advance.

When the current I is equal to or higher than the first threshold current Is1, and the input voltage Vin is lower than the first threshold voltage Vs1, the step-up voltage device 10 maintains the constant output voltage lower than a rated step-up voltage. When the input voltage Vin is lower than the second threshold voltage Vs2, the step-up voltage device 10 stops a step-up operation and outputs the output voltage Vo equal to the input voltage Vin.

The first threshold current IS1 of the current I is 100 A in the first embodiment but not limited. The first threshold voltage Vs1 and the second threshold voltage Vs2 of the input voltage Vin are 11V and 8V respectively in a third embodiment, but not limited.

Further, the rated step-up voltage is 20V in the first embodiment but not limited. The rated step-up voltage Vm may be equal to a voltage of the motor 30 (FIG. 2) providing the electric power steering apparatus 100 with the assist torque. The step-up voltage device 10 (FIG. 1) is designed to step up an input voltage Vin (12 V) output by the battery 1 to the rated step-up voltage Vm (20 V).

Figure 3:
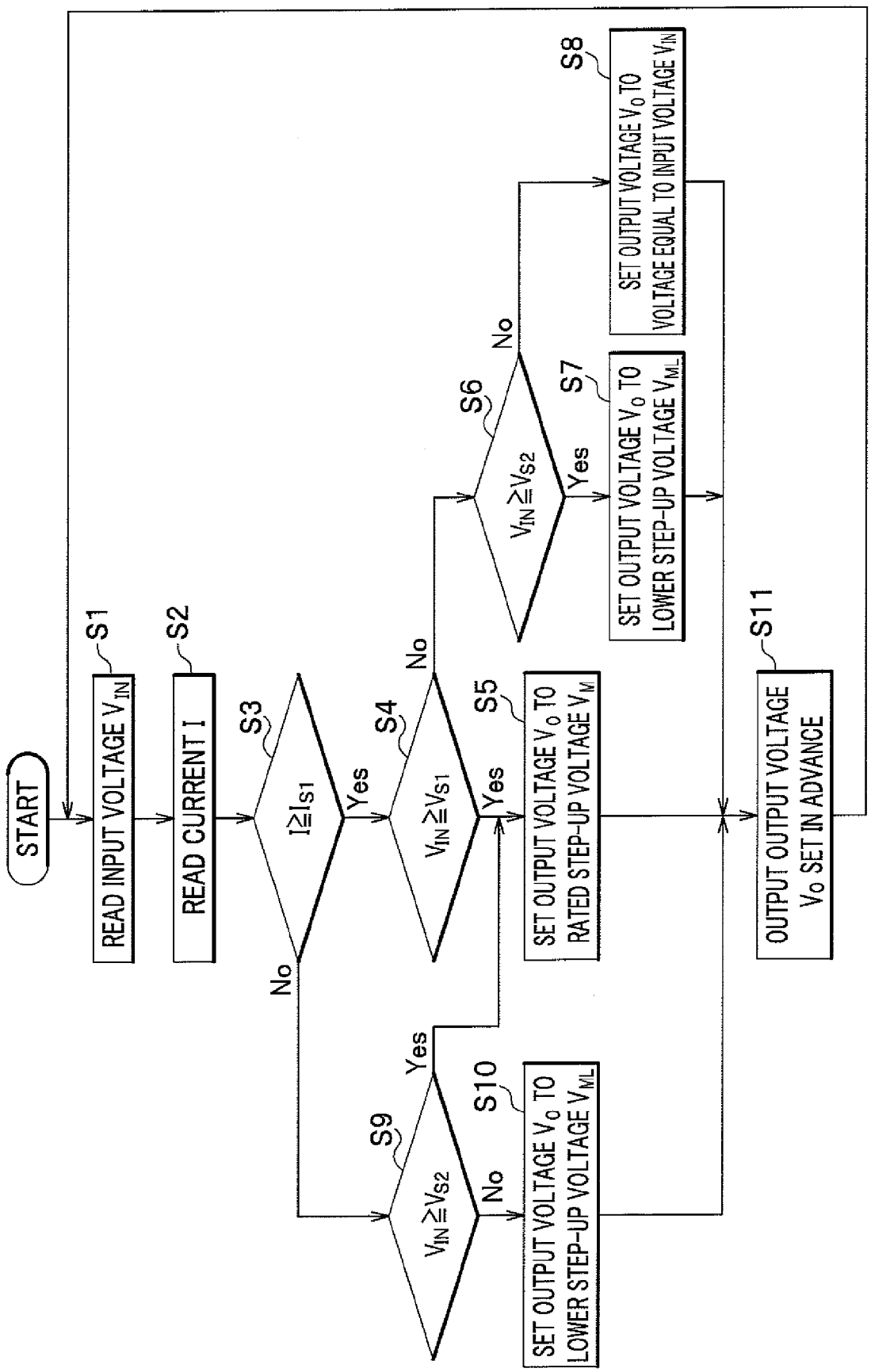
FIG. 3 is a flow chart showing steps of controlling a step-up operation of the output voltage.

FIG. 3 is a flow chart showing the step-up operation of the output voltage controlled by the step-up voltage control part 8 (FIG. 1). Hereinafter, the step-up operation of the output voltage Vo controlled by the step-up voltage control part 8 in the step-up voltage device 10 will be described with reference to FIG. 3

As shown in FIG. 3, the step-up voltage control part 8 reads the input voltage Vin output from the battery 1 by the voltage sensor 11 (step S1). Subsequently, the step-up voltage control part 8 reads the current I input to the input terminal In of the step-up voltage device 10 by the current sensor (step S2).

When the current I is equal to or higher than the first threshold current IS1 (100 A) (step S3, Yes), the step-up voltage control part 8 compares the input voltage Vin with the first threshold voltage Vs1 (11 V). Further, when the input voltage Vin is equal to or higher than the first threshold voltage Vs1 (11 V) (step S4, Yes), the step-up voltage control part 8 sets the output voltage Vo to the rated step-up voltage Vm (20 V) (step S5).

In the step S3 where the current I and the first threshold current IS1 are compared, after the current I is equal to or higher than the first threshold current IS1 for a predetermined time, the step-up voltage device 10 determines that the current I is equal to or higher than the first threshold current IS1. In other words, the value of the current I is equal to or higher than the first threshold current for the predetermined time, the step-up voltage device 10 determines that the current I is equal to or higher than the first threshold current IS1. On the contrary, when the current I is not equal to or lower than the first threshold current IS1 for the predetermined time, the step-up voltage device 10 determines that the current I is lower than the first threshold current IS1. In the embodiments, the setting of the current I is not limited, and the current I may be equal to or lower than a threshold current for a predetermined time.

The predetermined time is not limited and may be set in accordance with current characteristics of an electric circuit.

Further, the step-up voltage control part 8 determines that, when the value of the current I continues to be lower than the first threshold current Is1 for the predetermined time, the current I is lower than the first threshold current Is1.

The step-up voltage control part 8 may determine whether or not the current I is equal to or higher than the first threshold current IS1 on the basis of an average value calculated by integrating the current I. When the average value is equal to or higher than the first threshold current IS1, the step-up voltage control part 8 determines that the current I is equal to or higher than the first threshold current IS1.

Further, the step-up voltage control part 8 may determine whether or not the current I is lower than the first threshold current IS1 on the basis of an average value calculated by integrating the current I. When the average value is lower than the first threshold current IS1, the step-up voltage control part 8 determines that the current I is lower than the first threshold current IS1.

In the step S4 where the input voltage Vin and the first threshold voltage Vs1 are compared, after the input voltage Vin is equal to or higher than the first threshold voltage Vs1 for a predetermined time, the step-up voltage device 10 determines that the input voltage Vin is equal to or higher than the first threshold voltage Vs1. In other words, the value of the input voltage is equal to or higher than the first threshold voltage Vs1 for a predetermined time, the step-up voltage device 10 determines that the input voltage Vin is equal to or higher than the first threshold voltage Vs1. On the contrary, when the input voltage Vin is not equal to or lower than the first threshold voltage Vs1 for the predetermined time, the step-up voltage device 10 determines that the input voltage Vin is lower than the first threshold voltage Vs1.

The predetermined time is not limited and may be set in accordance with the current characteristics of the electric circuit.

Further, the step-up voltage control part 8 determines that, when the value of the input voltage Vin continues to be lower than the first threshold voltage Vs1 for the predetermined time, the input voltage Vin is lower than the first threshold voltage Vs1.

The step-up voltage control part 8 may determine whether or not the input current I is equal to or higher than the first threshold current IS1 on the basis of an average value calculated by integrating the current I. When the average value is equal to or higher than the first threshold current IS1 the step-up voltage control part 8 determines that the input current I is equal to or higher than the first threshold current IS1.

Further, the step-up voltage control part 8 may determine whether or not the input voltage Vin is lower than the first threshold voltage Vs1 on the basis of an average value calculated by integrating the input voltage Vin. When the average value is lower than the first threshold voltage Vs1, the step-up voltage control part 8 determines that the input voltage Vin is lower than the first threshold voltage Vs1.

When the input voltage Vin is lower than the first threshold voltage Vs1 (11 V) (step S4, No), the step-up voltage control part 8 compares the input voltage Vin with the second threshold voltage Vs2 (8 V). When the input voltage Vin is equal to or higher than the second threshold voltage Vs2 (8 V) (step S6, Yes), the step-up voltage control part 8 sets the output voltage Vo to a lower step-up voltage VML (step S7).

In the step S6 where the input voltage Vin and the second threshold voltage Vs2 are compared, when the input voltage Vin is equal to or higher than the second threshold voltage Vs2 for a predetermined time, the step-up voltage device 10 determines that the input voltage Vin is equal to or higher than the second threshold voltage Vs2. In other words, the value of the input voltage Vin is equal to or higher than the second threshold voltage Vs2 for the predetermined time, the step-up voltage device 10 determines that the input voltage Vin is equal to or higher than the second threshold voltage Vs2. On the contrary, when the input voltage Vin is not equal to or lower than the second threshold voltage Vs2 for the predetermined time, the step-up voltage device 10 determines that the input voltage Vin is lower than the second threshold voltage Vs2.

The predetermined time is not limited and may be set in accordance with the characteristics of an output voltage of the battery 1.

Further, the step-up voltage control part 8 determines that, when the value of the input voltage Vin continues to be lower than the second threshold voltage Vs2 for the predetermined time, the input voltage Vin is lower than the second threshold voltage Vs2.

The step-up voltage control part 8 may determine whether or not the input voltage Vin is equal to or higher than the second threshold voltage Vs2 on the basis of an average value calculated by integrating the input voltage Vin. When the average value is equal to or higher than the second threshold voltage Vs2, the step-up voltage control part 8 determines that the input voltage Vin is equal to or higher than the second threshold voltage Vs2.

Further, the step-up voltage control part 8 may determine whether or not the input voltage Vin is lower than the second threshold voltage Vs2 on the basis of an average value calculated by integrating the input voltage Vin. When the average value is lower than the second threshold voltage Vs2, the step-up voltage control part 8 determines that the input voltage Vin is lower than the second threshold voltage Vs2.

In the step S7, the lower step-up voltage VML is a voltage lower than the rated step-up voltage Vm (20 V), but not limited. The lower step-up voltage is 13 V in the first embodiment.

In the step S7, the step-up voltage device 10 discontinuously switches the output voltage Vo from the rated step-up voltage Vm (20 V) to the lower step-up voltage VML (13 V). Accordingly, when an current input to the step-up voltage device 10 is equal to or higher than the first threshold current, and a voltage applied to the step-up voltage device 10 is lower than the first threshold voltage, the step-up voltage device 10 discontinuously switches an output voltage from the rated step-up voltage to the lower step-up voltage.

When the input voltage Vo is lower than the second threshold voltage Vs2 (8 V) (step S6, Yes), the step-up voltage control part 8 sets the output voltage Vo to a voltage equal to the input voltage Vin (step S8). In other words, the step-up voltage control part 8 stops a step-up operation of the step-up voltage device 10.

Returning to the step S3, when the current I is lower than the first threshold current IS1 (100 A) (step S3, No), the step-up voltage control part 8 compares the input voltage Vin with the second threshold voltage Vs2 (8V) (step S9).

In the step S9 where the input voltage Vin and the second threshold voltage Vs2 are compared, after the input voltage Vin is equal to or higher than the second threshold voltage Vs2 for a predetermined time, the step-up voltage control part 8 determines that the input voltage Vin is equal to or higher than the second threshold voltage Vs2. In other words, the value of the input voltage is equal to or higher than the second threshold voltage Vs2 for the predetermined time, the step-up voltage control part 8 determines that the input voltage Vin is equal to or higher than the second threshold voltage Vs2. On the contrary, when the input voltage Vin is not equal to or lower than the second threshold voltage Vs2 for the predetermined time, the step-up voltage control part 8 determines that the input voltage Vin is lower than the second threshold voltage Vs2.

The predetermined time is not limited and may be set in accordance with the characteristics of an output voltage of the battery 1.

Further, the step-up voltage control part 8 determines that, when the value of the input voltage Vin continues to be lower than the second threshold voltage Vs2 for the predetermined time, the input voltage Vin is lower than the second threshold voltage Vs2.

The step-up voltage control part 8 may determine whether or not the input voltage Vin is equal to or higher than the second threshold voltage Vs2 on the basis of an average value calculated by integrating the input voltage Vin. When the average value is equal to or higher than the second threshold voltage Vs2, the step-up voltage control part 8 determines that the input voltage Vin is equal to or higher than the second threshold voltage Vs2.

Further, the step-up voltage control part 8 may determine whether or not the input voltage Vin is lower than the second threshold voltage Vs2 on the basis of an average value calculated by integrating the input voltage Vin. When the average value is lower than the second threshold voltage Vs2, the step-up voltage control part 8 determines that the input voltage Vin is lower than the second threshold voltage Vs2.

When the input voltage Vin is lower than the second threshold voltage Vs2 (8V) (step S9, No), the step-up voltage control part 8 sets the output voltage Vo to a lower step-up voltage VML (13 V) (step S10).

In the step S10, as the step-up voltage control part 8 sets the output voltage to the lower step-up voltage VML (13 V) which is lower than the rated step-up voltage Vm (20 V), the step-up voltage control part 8 discontinuously switches the output voltage. Accordingly, when a current input to the step-up voltage apparatus is lower than the first threshold current and a voltage applied to the step-up voltage apparatus is the second threshold voltage, the step-up voltage apparatus discontinuously switches an output voltage to a voltage which is lower than the rated step-up.

In the step S10, the step-up voltage control part 8 may stop the step-up operation of the step-up voltage device 10, set the output voltage Vo to a voltage equal to the input voltage Vin and output the voltage Vo.

When the input voltage Vin is equal to or higher than the second threshold voltage Vs2 (8 V) (step S9, Yes), the step-up voltage control part 8 sets the output voltage Vo to the rated step-up voltage Vm (step S5).

When the output voltage Vo is set in step S1 to S10, the step-up voltage control part 8 turns on/off the FETs 5 and 6 in order to output an output voltage Vo set from the output terminal of the step-up voltage device 10 (step S11).

Figure 4A:
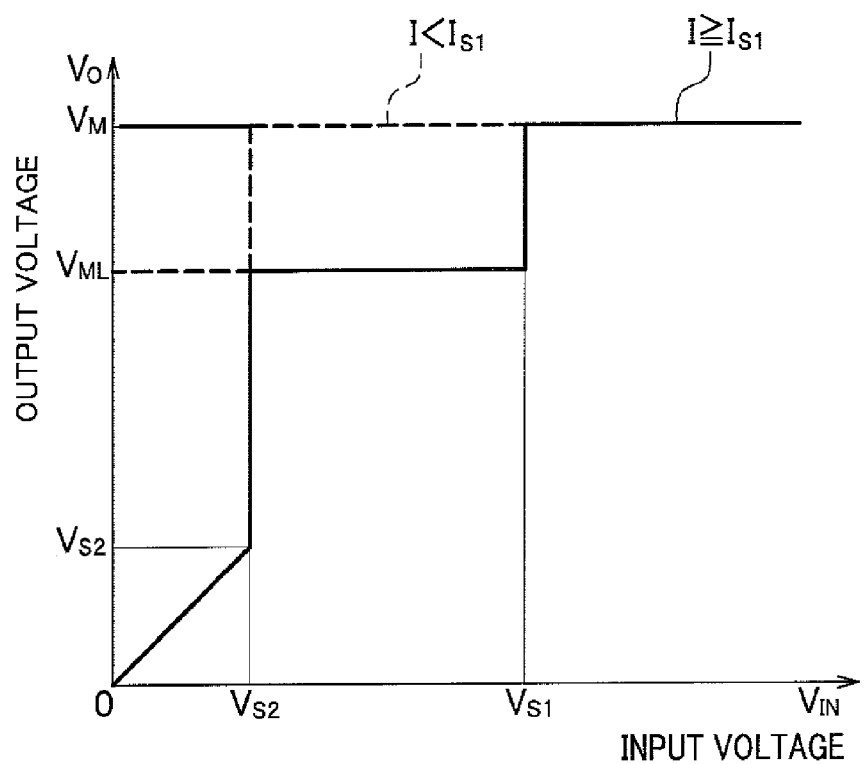
FIG. 4A is a graph showing a relation between an input voltage and an output voltage of a first embodiment, wherein a current is equal to or higher than a first threshold current, and wherein the current is lower than the first threshold current.
Figure 4B:
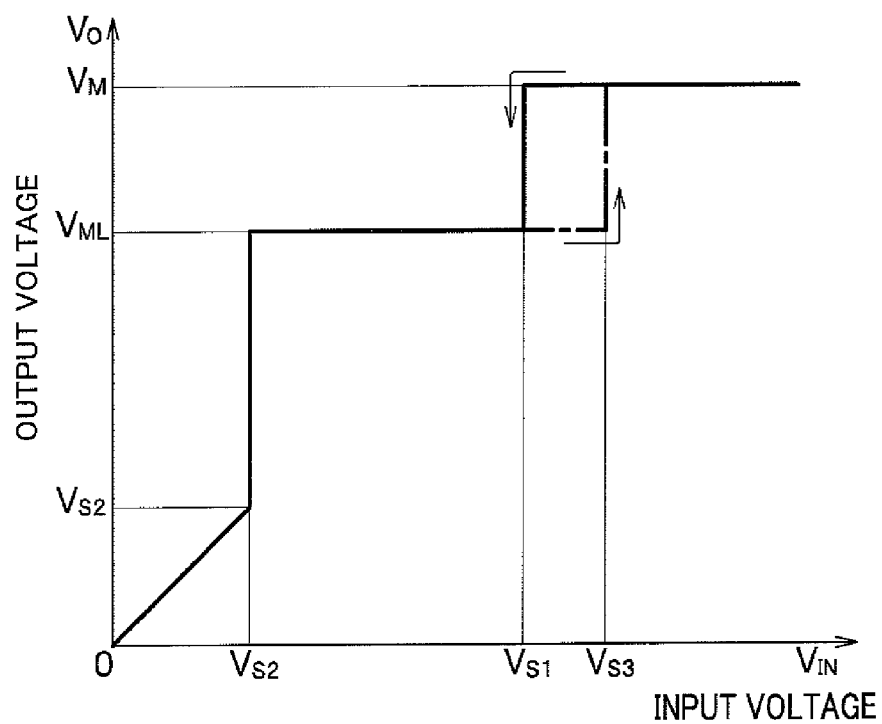
FIG. 4B is a graph showing the switching of the output voltage of the step-up voltage device from a lower step-up voltage to a rated step-up voltage.

FIGS. 4A and 4B are a graph showing a relation between the input voltage and the output voltage of the step-up voltage device. FIG. 4A is a graph showing a relation between the input voltage and the output voltage of the first embodiment in which the current I is equal to or higher than the first threshold current and is lower than the first threshold current. As shown in FIG. 4A, the current I input to the input terminal In of the step-up voltage device 10 (FIG. 1) is equal to or higher than the first threshold current IS1 (100 A)(shown in a solid line), and the input voltage Vin is equal to or higher than the first threshold voltage Vs1 (11 V), the output voltage Vo becomes equal to the rated step-up voltage Vm (20 V). When the input voltage Vin is lower than the first threshold voltage Vs1 (11 V), the output voltage Vo becomes equal to the lower step-up voltage VML (13 V). Further, when the input voltage Vin is lower than the second threshold voltage Vs2 (8 V), the output voltage Vo is set to a voltage equal to the input voltage Vin. In other words, the step-up voltage device 10 stops the step-up operation.

When the current I is lower than the first threshold current IS1 (100 A), the output voltage Vo is changed as shown in a dashed line in FIG. 4A. Accordingly, when the input voltage Vin is equal to or higher than the second threshold voltage Vs2 (8 V), the output voltage Vo is equal to the rated step-up voltage Vm. However, when the input voltage Vin is lower than the second threshold voltage Vs2 (8 V), the output voltage Vo is set to the lower step-up voltage VML (13 V).

In the first embodiment, when the current I input to the input terminal In of the step-up voltage device 10 is equal to or higher than the first threshold current IS1 (100 A), and the input voltage Vin is lower than the first threshold voltage Vs1 (11 V) and is equal to or higher than the second threshold voltage Vs2 (8 V), the step-up voltage device 10 outputs the voltage Vo which is equal to the lower step-up voltage VML.

Preferably, the step-up voltage device 10 (FIG. 1) steps up the input voltage Vin (11 V) and outputs the rated step-up voltage Vm (20 V). When the input voltage Vin becomes equal to or higher than the first threshold voltage Vs1 (11 V), the step-up voltage device 10 outputs the rated step-up voltage Vin (20 V). It is assumed that, when the input voltage Vin reaches equal to or higher than the first threshold voltage Vs1 (11 V), the step-up voltage device 10 outputs the rated step-up voltage Vm (20 V). When the input voltage Vin fluctuates and oscillates in the neighborhood of the first threshold voltage Vs1, the step-up voltage device 10 frequently switches the output voltage Vo back and forth in a range between the lower step-up voltage VML (13 V) and the rated step-up voltage Vm (20 V), and the hunting phenomenon occurs.

In order to prevent the hunting phenomenon 9, a third threshold voltage VS3 which is higher than the first threshold voltage Vs1 (11 V) is set in advance. When the input voltage Vin becomes equal to or higher than the third threshold voltage VS3, the step-up voltage device 10 may as well output the rated step-up voltage Vm (20 V). FIG. 4B is a graph showing that the output voltage Vo of the step-up voltage device 10 is switched from the lower step-up voltage VML to the rated step-up voltage Vm.

As shown in FIG. 4B, when the input voltage Vin decreases and becomes lower than the first threshold voltage Vs1, the output voltage Vo of the step-up voltage device 10 is switched from the rated step-up voltage Vm (20 V) to the lower step-up voltage VML (13 V) (shown in a solid line in FIG. 4B).

When the input voltage Vin increases and becomes equal to the first threshold voltage Vs1 (11 V), the output voltage Vo of the step-up voltage device 10 remains unchanged and is still equal to the lower step-up voltage VML. When the input voltage Vin increases further and becomes equal to or higher than the third threshold voltage VS3, the step-up voltage device 10 switches the output voltage Vo from the lower step-up voltage VML (13 V) to the rated step-up voltage Vm (20 V) (shown in a chain line in FIG. 4B).

Consequently, the step-up voltage device 10 sets the third threshold voltage VS3 to be switched and switches the output voltage Vo from the lower step-up voltage VML (13 V) to the rated step-up voltage Vm (20 V) on the basis of the third threshold voltage VS3, which can prevent the hunting phenomenon due to the fluctuation of the input voltage Vin.

The third threshold voltage VS3 is not limited and can be set with regards to the fluctuation of the output voltage Vo of the battery 1 in a steady state as needed. As mentioned above, the third threshold voltage VS3 is higher than the first threshold voltage Vs1, however, the third threshold voltage VS3 may be lower than the first threshold voltage Vs1.

When the output voltage Vo decreases along with the input voltage Vin and becomes lower than an operational voltage of electric elements (for example, integrated circuit, IC) which compose the control device 20 (FIG. 1) connected with the step-up voltage device 10 (FIG. 1), the control device 20 cannot operate properly.

In the first embodiment, when the current I is lower than the first threshold current Is1 (100 A), and the input voltage Vin is equal to or higher than the second threshold Vs2 (8 V), the step-up voltage device can output the lower step-up voltage VML (13 V). Therefore, the control device 20 can properly operate based on the electric elements to which 13 V is applied.

Second Embodiment

In the second embodiment, the step-up voltage device 10 (FIG. 1) is characterized in that the output voltage is determined on the basis of the current I input to the input terminal In.

The configuration and characteristics of the step-up voltage device 10 and the electric power steering apparatus 100 of the second embodiment are same as those of the first embodiment, and an explanation thereof will be omitted (refer to FIG. 1 to FIG. 2 as needed).

In the second embodiment, the step-up voltage device 10 detects a value of the current I increased and changes the control of step-up voltage operation on the basis of the value of the current I.

The step-up voltage device 10 sets in advance the first threshold current IS1 which is a threshold value of the current I input to the input terminal In of the step-up voltage device 10, the second threshold current IS2 which is higher than the first threshold current IS1, and the third threshold current IS3 which is higher than the second threshold current IS2. Further, the step-up voltage device 10 sets in advance the first threshold voltage Vs1 which is a threshold value of the input voltage Vin, and the second threshold voltage Vs2 which is lower than the first threshold voltage Vs1.

The step-up voltage device 10 changes the output voltage Vo, depending on the value of the current I. The current I is divided into four ranges. In a first range, the current I is equal to or higher than the third threshold current IS3. In a second range, the current I is equal to or higher than the second threshold current IS2 and is lower than the third threshold current IS3. In a third range, the current I is equal to or higher than the first threshold current IS1 and is lower than the second threshold current IS2. In a fourth range, the current I is lower than the first threshold current IS1.

Figure 5:
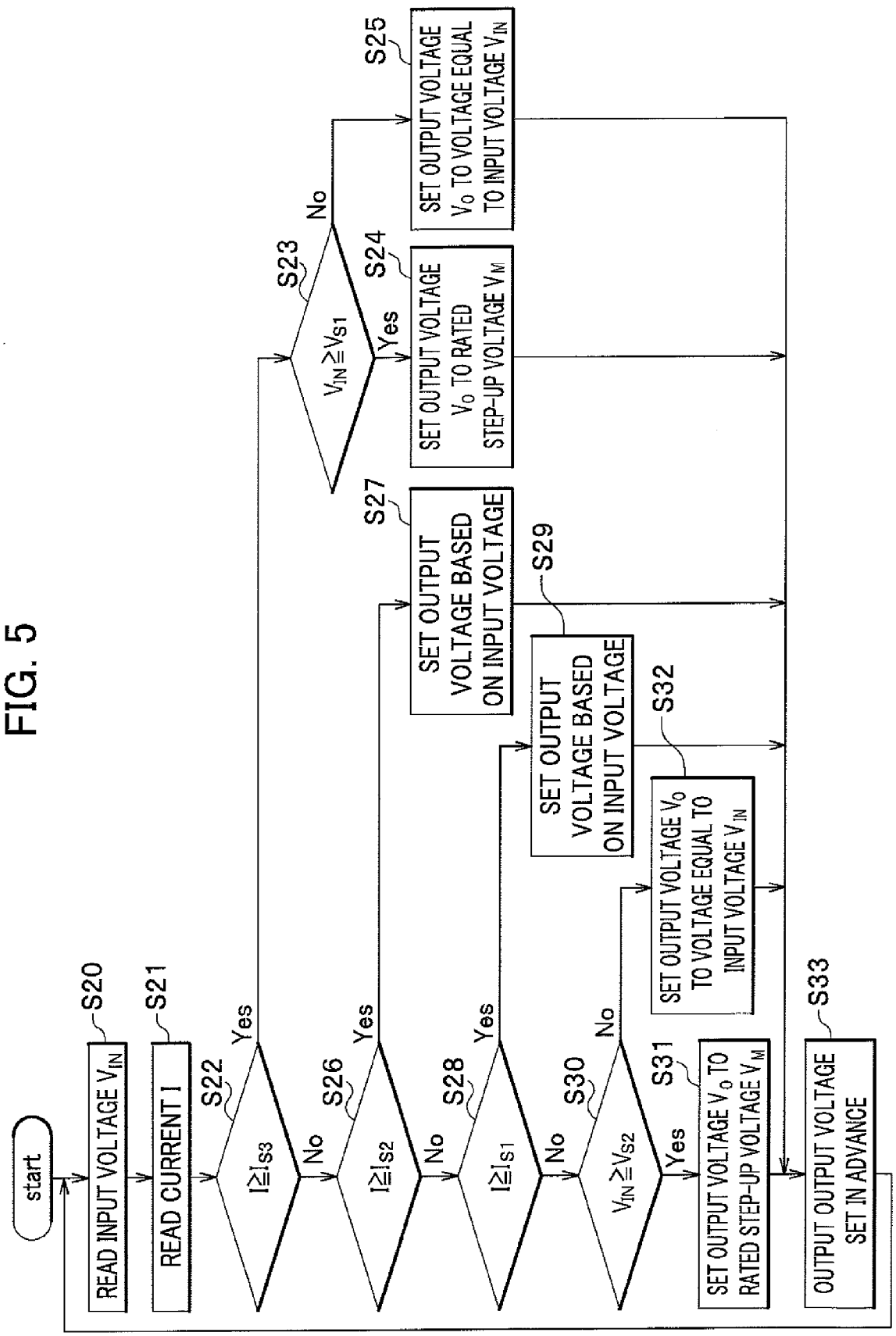
FIG. 5 is a flow chart showing a step of changing the output voltage of the step-up voltage device in accordance with a current input to an input terminal of the step-up voltage device.

FIG. 5 is a flow chart showing the step-up voltage operation controlled by the step-up voltage control device on the basis of the value of the current I input to the input terminal In.

In the second embodiment, the first threshold current IS1 is 100 A, the second threshold current IS2 is 120 A, and the third threshold current IS3 is 140 A, but these are not limited. Further, the first threshold voltage Vs1 and the second threshold voltage Vs2 are 11 V and 8 V respectively, but not limited.

As shown in FIG. 5, the step-up voltage control part 8 reads the input voltage Vin applied from the battery 1 by the voltage sensor 11 (step S20). Subsequently, the step-up voltage control part 8 reads the current I input to the input terminal In of the step-up voltage device 10 (step S21).

When the current I is equal to or higher than the third threshold current IS3 (140 A) (step S22, Yes), the step-up voltage control part 8 compares the input voltage Vin with the first threshold voltage Vs1 (11 V).

In the step S22 where the current I and the third threshold current IS3 are compared, after the current I has been equal to or higher than the third threshold current IS3 for a predetermined time, the step-up voltage control part 8 determines that the current I is equal to or higher than the third threshold current IS3. The predetermined time is not limited and may be set in accordance with the current characteristics of the electric circuit.

The step-up voltage control part 8 may determine whether or not the current I is equal to or higher than the third threshold current IS3 on the basis of an average value calculated by integrating the current I. When the average value is equal to or higher than the third threshold current IS3, the step-up voltage control part 8 determines that the current I is equal to or higher than the third threshold current IS3.

When the input voltage Vin is equal to or higher than the first threshold voltage Vs1 (step S23, Yes), the step-up voltage control part 8 sets the output voltage Vo to the rated step-up voltage Vm (20 V) (step S24).

When the input voltage Vin is lower than the first threshold voltage Vs1 (11 V) (step S23, No), the step-up voltage control part 8 sets the output voltage Vo to a voltage equal to the input voltage Vin (step S25). The step-up voltage control part 8 stops the step-up operation of the step-up voltage device 10. When the current input to the step-up voltage apparatus is equal to or higher than the second threshold current, and the voltage applied to the step-up voltage apparatus is lower than the first threshold voltage, the step-up voltage apparatus stops the step-up operation.

In the step S23 where the input voltage Vin and the first threshold voltage Vs1 are compared, after the input voltage Vin is equal to or higher than the first threshold voltage Vs1 for a predetermined time, the step-up voltage control part 8 determines that the input voltage Vin is equal to or higher than the first threshold voltage Vs1.

In other words, the value of the input voltage Vin is equal to or higher than the first threshold voltage Vs1 for the predetermined time, the step-up voltage control part 8 determines that the input voltage Vin is equal to or higher than the first threshold voltage Vs1. On the contrary, when the input voltage Vin is not equal to or lower than the first threshold voltage Vs1 for the predetermined time, step-up voltage control part 8 determines that the input voltage Vin is lower than the first threshold voltage Vs1. The predetermined time is not limited and may be set in accordance with the characteristics of an output voltage of the battery 1.

Further, the step-up voltage control part 8 determines that, when the value of the input voltage Vin continues to be lower than the first threshold voltage Vs1 for the predetermined time, the input voltage Vin is lower than the first threshold voltage Vs1.

The step-up voltage control part 8 may determine whether or not the input voltage Vin is equal to or higher than the first threshold voltage Vs1 on the basis of an average value calculated by integrating the input voltage Vin. When the average value is equal to or higher than the first threshold voltage Vs1, the step-up voltage control part 8 determines that the input voltage Vin is equal to or higher than the first threshold voltage Vs1.

Further, the step-up voltage control part 8 may determine whether or not the input voltage Vin is lower than the first threshold voltage Vs1 on the basis of an average value calculated by integrating the input voltage Vin. When the average value is lower than the first threshold voltage Vs1, the step-up voltage control part 8 determines that the input voltage Vin is lower than the first threshold voltage Vs1.

When the current I is lower than the third threshold current IS3 (140 A) (step S22, No), the step-up voltage control part 8 compares the current I with the second threshold current IS2 (120 A). When the current I is equal to or higher than the second threshold current IS2 (120 A) (step S26), the step-up voltage control part 8 sets the output voltage Vo on the basis of the input voltage Vin (step S27). The step S27 will be described later in detail (refer to FIG. 6A).

In the step S26 where the current I and the second threshold current IS2 are compared, after the current I is equal to or higher than the second threshold current IS2 for a predetermined time, the step-up voltage control part 8 determines that the current I is equal to or higher than the second threshold current IS2. In other words, the value of the current I is equal to or higher than the second threshold current IS2 for the predetermined time, the step-up voltage control part 8 determines that the current I is equal to or higher than the second threshold current IS2. On the contrary, when the current I is not equal to or lower than the second threshold current IS2 for the predetermined time, the step-up voltage control part 8 determines that the current I is lower than the second threshold current IS2.

The predetermined time is not limited and may be set in accordance with the current characteristics of the electric circuit.

Further, the step-up voltage control part 8 determines that, when the value of the current I continues to be lower than the second threshold current Is2 for the predetermined time, the current I is lower than the second threshold current Is2.

The step-up voltage control part 8 may determine whether or not the current I is equal to or higher than the first threshold current IS2 on the basis of an average value calculated by integrating the current I. When the average value becomes equal to or higher than the first threshold current IS2, the step-up voltage control part 8 determines that the current I is equal to or higher than the first threshold current IS2.

Further, the step-up voltage control part 8 may determine whether or not the current I is lower than the second threshold current IS2 on the basis of an average value calculated by integrating the current I. When the average value is lower than the second threshold current IS2, the step-up voltage control part 8 determines that the current I is lower than the second threshold current IS2.

Further, when the current I is lower than the second threshold current IS2 (120 A) (step S26, No), the step-up voltage control part 8 compares the current I with the first threshold current IS1 (100 A). When the current I is equal to or higher than the first threshold current IS1 (100 A) (step S28, Yes), the step-up voltage control part 8 sets the output voltage Vo of the step-up voltage device 10 on the basis of the input voltage Vin (step S29). The step S29 will be described later in detail (FIG. 6B).

In the step S28 where the current I and the first threshold current IS1 are compared, after the current I is equal to or higher than the first threshold current IS1 for a predetermined time, the step-up voltage control part 8 determines that the current I is equal to or higher than the first threshold current IS1. In other words, the value of the current I is equal to or higher than the first threshold current IS1 for the predetermined time, the step-up voltage control part 8 determines that the current I is equal to or higher than the first threshold current IS1. On the contrary, when the current I is not equal to or lower than the first threshold current IS1 for the predetermined time, the step-up voltage device 10 determines that the current I is lower than the first threshold current IS1.

The predetermined time is not limited and may be set in accordance with the current characteristics of the electric circuit.

Further, the step-up voltage control part 8 determines that, when the value of the current I continues to be lower than the first threshold current Is1 for the predetermined time, the current I is lower than the first threshold current Is1.

The step-up voltage control part 8 may determine whether or not the current I is equal to or higher than the first threshold current IS1 on the basis of an average value calculated by integrating the current I. When the average value becomes equal to or higher than the first threshold current IS1, the step-up voltage control part 8 determines that the current I is equal to or higher than the first threshold current IS1.

Further, the step-up voltage control part 8 may determine whether or not the current I is lower than the first threshold current IS1 on the basis of an average value calculated by integrating the current I. When the average value is lower than the first threshold current IS1, the step-up voltage control part 8 determines that the current I is lower than the first threshold current IS1.

When the current I is lower than the first threshold current IS1 (100 A) (step S28, No), the step-up voltage control part 8 compares the input voltage Vin with the second threshold voltage Vs2 (8 V). When the input voltage Vin is equal to or higher than the second threshold voltage Vs2 (8 V) (step S30, Yes), the step-up voltage control part 8 sets the output voltage Vo to the rated step-up voltage Vm (20 V) (step S31).

When the input voltage Vin is lower than the second threshold voltage Vs2 (8 V) (step S30, No), the step-up voltage control part 8 sets the output voltage Vo to a voltage equal to the input voltage Vin (step S32). In other words, the step-up voltage control part 8 stops a step-up operation of the step-up voltage device 10.

In the step S30 where the input voltage Vin and the second threshold voltage Vs2 are compared, after the input voltage Vin is equal to or higher than the second threshold voltage Vs2 for a predetermined time, the step-up voltage control part 8 determines that the input voltage Vin is equal to or higher than the second threshold voltage Vs2. In other words, the value of the input voltage is equal to or higher than the second threshold voltage Vs2 for the predetermined time, the step-up voltage control part 8 determines that the input voltage Vin is equal to or higher than the second threshold voltage Vs2. On the contrary, when the input voltage Vin is lower than the second threshold voltage Vs2 for the predetermined time, the step-up voltage control part 8 determines that the input voltage Vin is lower than the second threshold voltage Vs2.

The predetermined time is not limited and may be set in accordance with the characteristics of an output voltage of the battery 1.

Further, the step-up voltage control part 8 determines that, when the value of the input voltage Vin continues to be lower than the second threshold voltage Vs2 for the predetermined time, the input voltage Vin is lower than the second threshold voltage Vs2.

The step-up voltage control part 8 may determine whether or not the input voltage Vin is equal to or higher than the second threshold voltage Vs2 on the basis of an average value calculated by integrating the input voltage Vin. When the average value is equal to or higher than the second threshold voltage Vs2, the step-up voltage control part 8 determines that the input voltage Vin is equal to or higher than the second threshold voltage Vs2.

Further, the step-up voltage control part 8 may determine whether or not the input voltage Vin is lower than the second threshold voltage Vs2 on the basis of an average value calculated by integrating the input voltage Vin. When the average value is lower than the second threshold voltage Vs2, the step-up voltage control part 8 determines that the input voltage Vin is lower than the second threshold voltage Vs2.

When the output voltage Vo is set in the steps S20 to S32, the step-up voltage control part 8 turns on/off the FETs 5 and 6 to output the output voltage Vo from the output terminal of the step-up voltage device 10 (step S33).

Figure 6A:
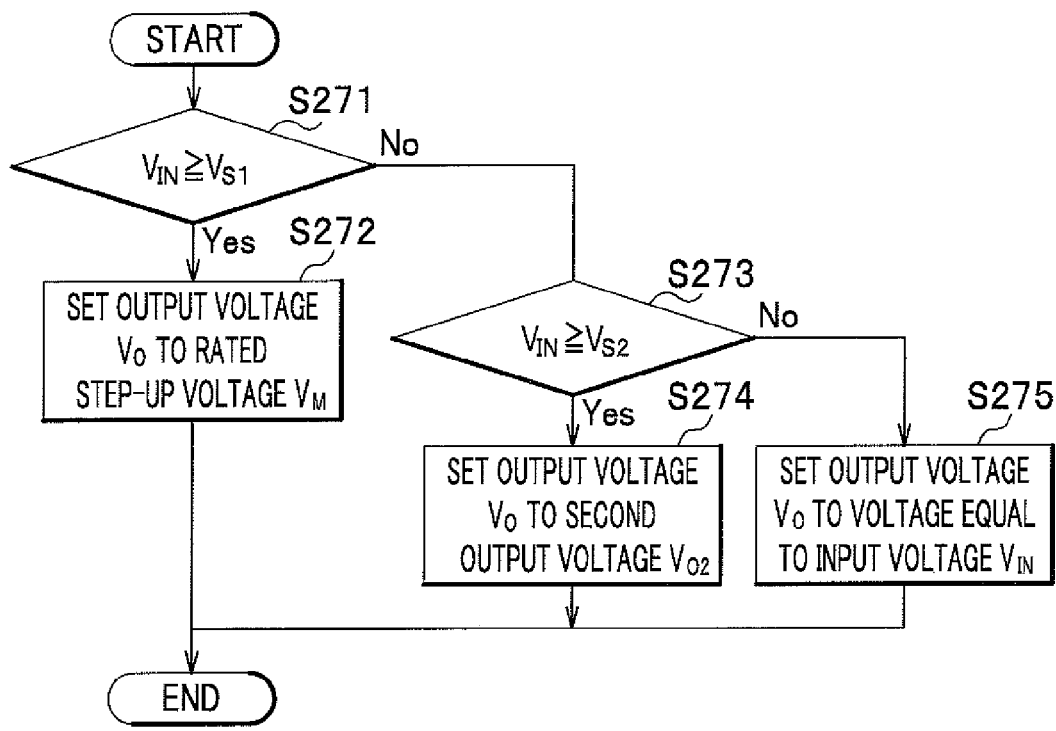
FIG. 6A is a flow chart showing a step of setting an output voltage on the basis of an input voltage, when a current input to the step-up voltage device is equal to or higher than a second threshold voltage and is lower than a third threshold voltage.
Figure 6B:
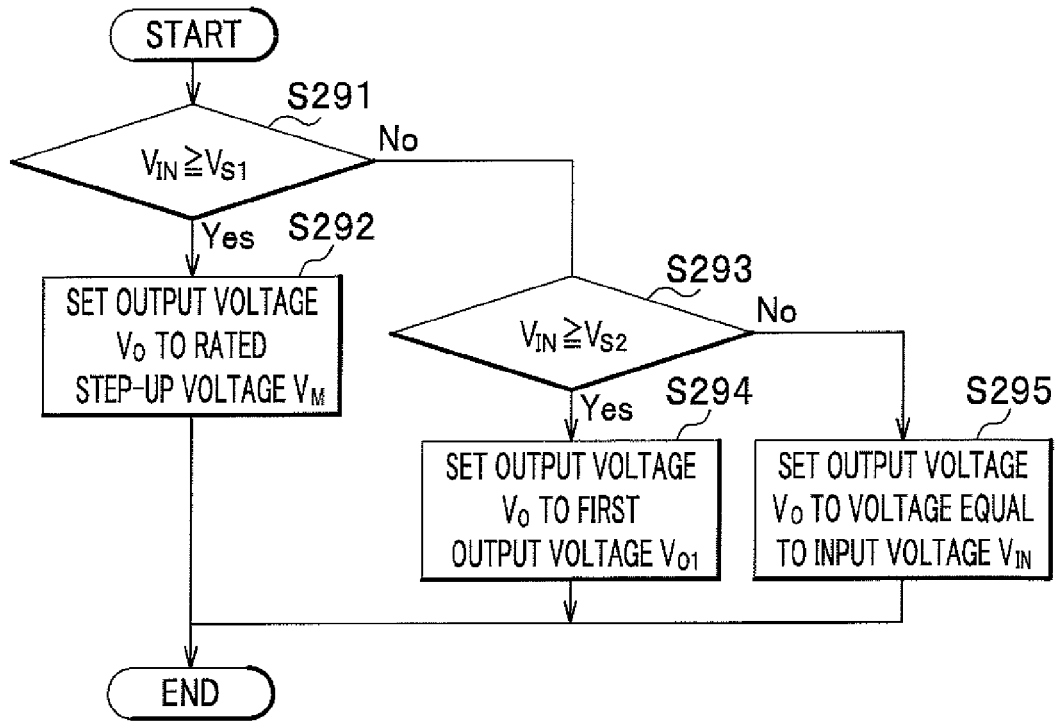
FIG. 6B is a flow chart showing a step of setting the output voltage on the basis of the input voltage, when the current input to the step-up voltage device is equal to or higher than the first threshold voltage and is lower than the second threshold voltage.

FIGS. 6A and 6B are a flow chart setting the output voltage on the basis of the input voltage. FIG. 6A is a flow chart which describes the step S27 in FIG. 5 in detail. To be specific, when the current input to the step-up voltage device is equal to or higher than the second threshold current and is lower than the third threshold current IS3, an output voltage Vo is set on the basis of the input voltage Vin. Hereinafter, in the following steps, the setting of the output voltage Vo will be described with reference to FIG. 6A (FIG. 1 to FIG. 5).

When the step-up voltage control part 8 compares the input voltage Vin with the first threshold voltage Vs1 (11V), and the input voltage Vin is equal to or higher than the first threshold voltage Vs1 (step S271, Yes), the step-up voltage control part 8 sets the output voltage Vo whose value is equal to the rated step-up voltage Vm (20 V) (step S272). The step-up voltage control part 8 finishes the step S272 of setting the output voltage Vo and the step 272 proceeds to a step S33 in FIG. 5.

In the step S271 where the input voltage Vin and the first threshold voltage Vs1 are compared, after the input voltage Vin is equal to or higher than the first threshold voltage Vs1 for a predetermined time, the step-up voltage control part 8 determines that the input voltage Vin is equal to or higher than the first threshold voltage Vs1. In other words, the value of the input voltage is equal to or higher than the first threshold voltage Vs1 for the predetermined time, the step-up voltage control part 8 determines that the input voltage Vin is equal to or higher than the first threshold voltage Vs1. On the contrary, when the input voltage Vin is not equal to or lower than the first threshold voltage Vs1 for the predetermined time, the step-up voltage control part 8 determines that the input voltage Vin is lower than the first threshold voltage Vs1.

The predetermined time is not limited and may be set in accordance with the characteristics of the output voltage of the battery 1.

Further, the step-up voltage control part 8 determines that, when the value of the input voltage Vin continues to be lower than the first threshold voltage Vs1 for the predetermined time, the input voltage Vin is lower than the first threshold voltage Vs1.

The step-up voltage control part 8 may determine whether or not the input voltage Vin is equal to or higher than the first threshold voltage Vs1 on the basis of an average value calculated by integrating the input voltage Vin. When the average value becomes equal to or higher than the first threshold voltage Vs1, the step-up voltage control part 8 determines that the input voltage Vin is equal to or higher than the first threshold voltage Vs1.

Further, the step-up voltage control part 8 may determine whether or not the input voltage Vin is lower than the first threshold voltage Vs1 on the basis of an average value calculated by integrating the input voltage Vin. When the average value is lower than the first threshold voltage Vs1, the step-up voltage control part 8 determines that the input voltage Vin is lower than the first threshold voltage Vs1.

When the input voltage Vin is lower than the first threshold voltage Vs1 (11V) (step S271, No), the step-up voltage control part 8 compares the input voltage Vin with the second threshold voltage Vs2 (8 V). When the input voltage Vin is lower than the second threshold voltage Vs2 (8 V) (step S273, No), the step-up voltage control part 8 sets the output voltage Vo to a voltage equal to the input voltage Vin (step S275). In other words, the step-up voltage control part 8 stops a step-up operation of the step-up voltage device 10.

In the step S273 where the input voltage Vin and the second threshold voltage Vs2 are compared, after the input voltage Vin is equal to or higher than the second threshold voltage Vs2 for a predetermined time, the step-up voltage control part 8 determines that the input voltage Vin is equal to or higher than the second threshold voltage Vs2. In other words, the value of the input voltage Vin is equal to or higher than the second threshold voltage Vs2 for the predetermined time, the step-up voltage control part 8 determines that the input voltage Vin is equal to or higher than the second threshold voltage Vs2. On the contrary, when the input voltage Vin is not equal to or lower than the second threshold voltage Vs2 for the predetermined time, the step-up voltage control part 8 determines that the input voltage Vin is lower than the second threshold voltage Vs2.

The predetermined time is not limited and may be set in accordance with the characteristics of the output voltage of the battery 1.

Further, the step-up voltage control part 8 determines that, when the value of the input voltage Vin continues to be lower than the second threshold voltage Vs2 for the predetermined time, the input voltage Vin is lower than the second threshold voltage Vs2.

The step-up voltage control part 8 may determine whether or not the input voltage Vin is equal to or higher than the second threshold voltage Vs2 on the basis of an average value calculated by integrating the input voltage Vin. When the average value becomes equal to or higher than the second threshold voltage Vs2, the step-up voltage control part 8 determines that the input voltage Vin is equal to or higher than the second threshold voltage Vs2.

Further, the step-up voltage control part 8 may determine whether or not the input voltage Vin is lower than the second threshold voltage Vs2 on the basis of an average value calculated by integrating the input voltage Vin. When the average value is lower than the second threshold voltage Vs2, the step-up voltage control part 8 determines that the input voltage Vin is lower than the second threshold voltage Vs2.

When the input voltage Vin is equal to or higher than the second threshold voltage Vs2 (8 V) (step S273, Yes), the step-up voltage control part 8 sets the output voltage Vo to a second output voltage Vo2 (step S274). When the current input to the input terminal of the step-up voltage device 10 is equal to or higher than the second threshold current IS2 (120 A) and is lower than the third threshold current IS3 (140 A), the second output voltage Vo2 is set as an output voltage Vo. The second output voltage Vo2 is preferably lower than the rated step-up voltage Vm (20 V). The second output voltage Vo2 is 12 V in the second embodiment.

The step-up voltage control part 8 finishes the step of setting the output voltage Vo, and the step proceeds to the step S33.

FIG. 6B is a flow chart showing the step S29 of FIG. 5 in detail. To be specific, when the current input to the step-up voltage device is equal to or higher than the first threshold current IS1 and is lower than the second threshold current IS2, the output voltage Vo is set on the basis of the input voltage Vin. Hereinafter, in the following step, the setting of the output voltage Vo will be described with reference to FIG. 6B (FIG. 1 to FIG. 5 as needed).

The step-up voltage control part 8 compares the input voltage Vin with the first threshold voltage Vs1 (11 V). When the input voltage Vin is equal to or higher than the first threshold voltage Vs1 (step S291, Yes), the step-up voltage control part 8 sets the output voltage Vo whose value is equal to the rated step-up voltage Vm (20 V) (step S292). The step-up voltage control part 8 finishes the step S292 of setting the output voltage Vo and the step S292 proceeds to the step S33 in FIG. 5.

In the step S291 where the input voltage Vin and the first threshold voltage Vs1 are compared, when the input voltage Vin is equal to or higher than the first threshold voltage Vs1 for a predetermined time, the step-up voltage control part 8 determines that the input voltage Vin is equal to or higher than the first threshold voltage Vs1. In other words, the value of the input voltage Vin is equal to or higher than the first threshold voltage Vs1 for the predetermined time, the step-up voltage control part 8 determines that the input voltage Vin is equal to or higher than the first threshold voltage Vs1. On the contrary, when the input voltage Vin is not equal to or lower than the first threshold voltage Vs1 for the predetermined time, the step-up voltage control part 8 determines that the input voltage Vin is lower than the first threshold voltage Vs1.

The predetermined time is not limited and may be set in accordance with the characteristics of the output voltage of the battery 1.

Further, the step-up voltage control part 8 determines that, when the value of the input voltage Vin continues to be lower than the first threshold voltage Vs1 for the predetermined time, the input voltage Vin is lower than the first threshold voltage Vs1.

The step-up voltage control part 8 may determine whether or not the input voltage Vin is equal to or higher than the first threshold voltage Vs1 on the basis of an average value calculated by integrating the input voltage Vin. When the average value becomes equal to or higher than the first threshold voltage Vs1, the step-up voltage control part 8 determines that the input voltage Vin is equal to or higher than the first threshold voltage Vs1.

Further, the step-up voltage control part 8 may determine whether or not the input voltage Vin is lower than the first threshold voltage Vs1 on the basis of an average value calculated by integrating the input voltage Vin. When the average value is lower than the first threshold voltage Vs1, the step-up voltage control part 8 determines that the input voltage Vin is lower than the first threshold voltage Vs1.

When the input voltage Vin is lower than the first threshold voltage Vs1 (11 V) (step S291, No), the step-up voltage control part 8 compares the input voltage Vin with the second threshold voltage Vs2 (8 V). When the input voltage Vin is lower than the second threshold voltage Vs2 (8 V) (step S293, No), the step-up voltage control part 8 sets the output voltage Vo to an output voltage equal to the input voltage Vin (step S295). In other words, the step-up voltage control part 8 stops the step-up operation of the step-up voltage device 10.

In the step S293 where the input voltage Vin and the second threshold voltage Vs2 are compared, after the input voltage Vin has been equal to or higher than the second threshold voltage Vs2 for a predetermined time, the step-up voltage control part 8 determines that the input voltage Vin is equal to or higher than the second threshold voltage Vs2. In other words, when the input voltage Vin has not been equal to or lower than the second threshold voltage Vs2 for the predetermined time, step-up voltage control part 8 determines that the input voltage Vin is lower than the second threshold voltage Vs2.

The predetermined time is not limited and may be set in accordance with the characteristics of the output voltage of the battery 1.

Further, the step-up voltage control part 8 determines that, when the value of the input voltage Vin continues to be lower than the second threshold voltage Vs2 for the predetermined time, the input voltage Vin is lower than the second threshold voltage Vs2.

The step-up voltage control part 8 may determine whether or not the input voltage Vin is equal to or higher than the second threshold voltage Vs2 on the basis of an average value calculated by integrating the input voltage Vin. When the average value becomes equal to or higher than the second threshold voltage Vs2, the step-up voltage control part 8 determines that the input voltage Vin is equal to or higher than the second threshold voltage Vs2.

Further, the step-up voltage control part 8 may determine whether or not the input voltage Vin is lower than the second threshold voltage Vs2 on the basis of an average value calculated by integrating the input voltage Vin. When the average value is lower than the second threshold voltage Vs2, the step-up voltage control part 8 determines that the input voltage Vin is lower than the second threshold voltage Vs2.

When the input voltage Vin is equal to or higher than the second threshold voltage Vs2 (8 V) (step S293, Yes), the step-up voltage control part 8 sets an output voltage Vo to a first output voltage Vo1 (step S294). When the current I input to the input terminal In of the step-up voltage device 10 is equal to or higher than the first threshold current IS1 (100 A) and is lower than the second threshold current IS2 (120 A), the first output voltage Vo1 is set as the output voltage Vo. The first output voltage Vo1 is preferably higher than the second threshold voltage Vs2 (12 V). The first output voltage Vo1 is 13 V in the second embodiment.

The step-up voltage control part 8 finishes the step S294 of setting the output voltage Vo and the step S294 proceeds to the step S33 in FIG. 5.

Figure 7:
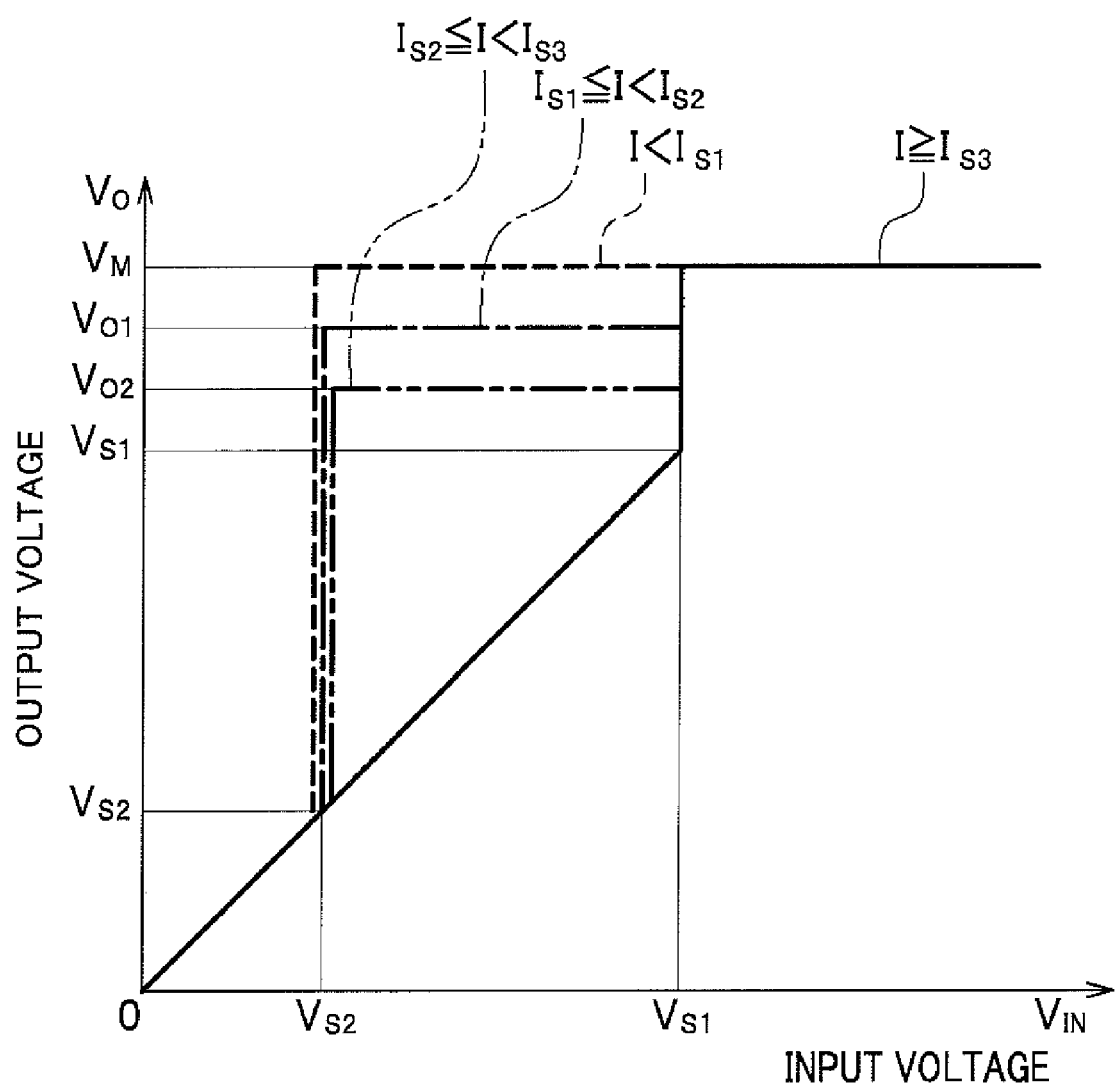
FIG. 7 is a graph showing a relation between the input voltage and the output voltage in accordance with the current input to the step-up voltage device.

FIG. 7 is a graph showing a relation between the input voltage and the output voltage corresponding to the current input to the step-up voltage device.

When the current I input to the step-up voltage device 10 (FIG. 1) is equal to or higher than the third threshold current IS3 (140 V), the current I is shown in a solid line in FIG. 7. Accordingly, the input voltage Vin is equal to or higher than the first threshold voltage Vs1 (11 V), the step-up voltage control part 8 sets the output voltage Vo to the rated step-up voltage Vm. When the input voltage Vin is lower than the first threshold voltage Vs1 (11 V), the step-up voltage control part 8 sets the output voltage Vo to a voltage equal to the input voltage Vin. The step-up voltage device 10 stops the step-up operation.

When the current I input to the step-up voltage device 10 (FIG. 1) is equal to or higher than the second threshold current IS2 (120 A) and is lower than the third threshold current IS3 (140 A), the current I is shown in a chain double-dashed line in FIG. 7. When the input voltage Vin is equal to or higher than the first threshold voltage Vs1 (11 V), the step-up voltage control part 8 sets the output voltage Vo to the rated step-up voltage Vm (20 V). When the input voltage Vin is lower than the first threshold voltage Vs1 (11 V), the step-up voltage control part 8 sets the output voltage Vo to a voltage equal to the input voltage Vin. In other words, the step-up voltage device 10 stops the step-up operation.

When the current I input to the step-up voltage device 10 (FIG. 1) is equal to or higher than the first threshold current IS1 (100 A) and is lower than the second threshold current IS2 (120 A), the current I is shown in a one-point chain line in FIG. 7. Accordingly, when the input voltage Vin is equal to or higher than the first threshold voltage Vs1 (11 V), the step-up voltage control part 8 sets the output voltage Vo to the rated step-up voltage Vm (20 V). When the input voltage Vin is lower than the first threshold voltage Vs1 (11 V), the step-up voltage control part 8 sets the output voltage Vo to the first output voltage Vo1 (13 V). Further, when the input voltage Vin is lower than the second threshold voltage Vs2 (8 V), the step-up voltage control part 8 sets the output voltage Vo to a voltage equal to the input voltage Vin. In other words, the step-up voltage device 10 stops the step-up operation.

When the current I input to the step-up voltage device 10 (FIG. 1) is lower than the first threshold current IS1 (100 A), the current I is shown in a dashed line in FIG. 7. Accordingly, when the input voltage Vin is equal to or higher than the second threshold voltage Vs2 (8 V), the step-up voltage control part 8 sets the output voltage Vo to the rated step-up voltage Vm (20 V). When the input voltage Vin is lower than the second threshold voltage Vs2 (8 V), the step-up voltage control part 8 sets the output voltage Vo to a voltage equal to the input voltage Vin. In other words, the step-up voltage device 10 stops the step-up operation.

As mentioned above, the step-up voltage device 10 (FIG. 1) can effectively output the maximum output voltage Vo by setting the output voltage Vo on the basis of the current I input to the step-up voltage device 10 in a range where the battery 1 is not damaged. The control device 20 (FIG. 1) includes an electrical part which can preferably be operated when a voltage drops, and can give a warning signal when an operational voltage becomes lower than a predetermined voltage value (for example, when the control device 20 includes a function of giving a warning, the electrical part includes the function of giving a warning). When the electrical part operates on the second output voltage Vo2 (12 V), and other parts operate on the first output voltage Vo1 (13 V), the operation of the control device 20 can be stable even when the battery 1 deteriorates, thereby an excellent effect can be made.

In the second embodiment, the threshold values of the current I are the first threshold current IS1 (100 A), the second threshold current IS2 (120 A) and the third threshold current IS3 (140 A) but not limited.

Third Embodiment

In the third embodiment, the step-up voltage device 10 (FIG. 1) is characterized in that the output voltage Vo can be changed on the basis of the current I input to the input terminal In of the step-up voltage device 10.

The structure and characteristics of the step-up voltage device 10 and the electric power steering apparatus 100 of the third embodiment are same as those of the first embodiment. Therefore, an explanation will be omitted (refer to FIG. 1 to FIG. 2 as needed).

In the third embodiment, the step-up voltage device 10 is characterized in that the value of the increased current I is detected and the output voltage Vo is controlled on the basis of the value of the current I. The threshold value of the current I input to the input terminal In of the step-up voltage device 10 is shown as the first threshold current IS1, which is determined in advance. Further, the threshold value of the input voltage Vin is the first threshold voltage Vs1, which is determined in advance. The threshold value which is lower than the first threshold voltage Vs1 is shown as the second threshold voltage Vs2 which is determined in advance. When the current I is equal to or higher than the first threshold current IS1, and the input voltage Vin is lower than the first threshold voltage Vs1, the step-up voltage control part 8 stops the step-up operation of the step-up voltage device 10 and sets the output voltage Vo to a voltage which is lower than the rated step-up voltage.

When the current I is lower than the first threshold current IS1, and the input voltage Vin is lower than the second threshold voltage Vs2, the step-up voltage control part 8 stops the step-up operation of the step-up voltage device 10 and sets the output voltage Vo to a voltage which is lower than the rated step-up voltage Vm.

Figure 8:
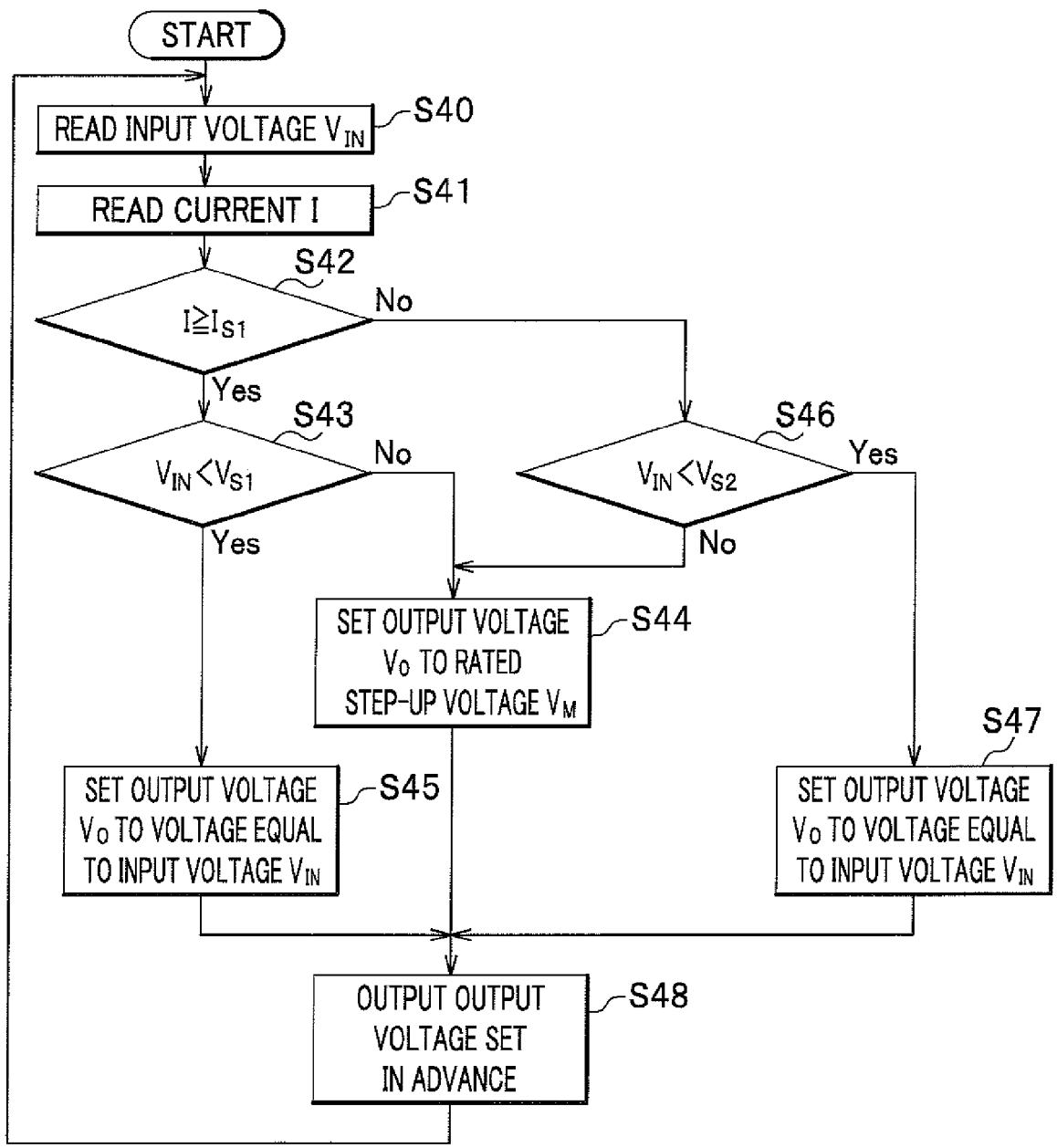
FIG. 8 is a flow chart showing a step of controlling a step-up operation of a voltage.

FIG. 8 is a flow chart showing the steps of controlling the step-up operation of an output voltage Vo. Hereinafter, the operation of the step-up voltage device 10 will be explained with reference to FIG. 8 (refer to FIG. 1 as needed).

The first threshold current IS1 is 100 A but not limited. The first threshold voltage Vs1 and the second threshold voltage Vs2 are 11 V and 8 V respectively but not limited.

The rated step-up voltage Vm is 20 V but not limited.

the step-up voltage control part 8 reads the input voltage Vin output from the battery 1 by the voltage sensor 11 (step S40). Subsequently, the step-up voltage control part 8 reads the current I input to the input terminal In of the step-up voltage device 10 (step S41).

When the current I is equal to or higher than the first threshold current IS1 (100 A) (step S42, Yes), the step-up voltage control part 8 determines whether or not the input voltage Vin is equal to or higher than the first threshold voltage Vs1 (11 V) (step S43). when the input voltage Vin is equal to or higher than the first threshold voltage Vs1 (11 V) (step S43, No), the step-up voltage control part 8 sets the output voltage Vo to the rated step-up voltage Vm (20 V) (step S44).

When the input voltage Vin is lower than the first threshold voltage Vs1 (11 V) (step S43, Yes), the step-up voltage control part 8 sets the output voltage Vo to a voltage equal to the input voltage Vin (step S45). In other words, the step-up voltage control part 8 stops the step-up operation of the step-up voltage device 10. Therefore, when the current input to the step-up voltage apparatus is equal to or higher than the first threshold current, and the voltage applied to the step-up voltage apparatus is lower than the first threshold voltage, the step-up voltage apparatus stops the step-up operation.

In the step 45 where the output voltage Vo is changed from the rated step-up voltage Vm (20 V) to a voltage equal to the input voltage Vin, as the input voltage Vin is lower than the first threshold voltage Vs1 (11 V), the output voltage Vo is discontinuously switched. When the current I input to the step-up voltage apparatus is equal to or higher than the first threshold current Is1, and the voltage applied to the step-up voltage apparatus is lower than the first threshold voltage, the step-up voltage apparatus discontinuously switches the output voltage Vo to a voltage lower than the rated step-up voltage Vm.

In the step S43 where the input voltage Vin and the first threshold voltage Vs1 are compared, after the input voltage Vin is equal to or higher than the first threshold voltage Vs1 for a predetermined time, the step-up voltage control part 8 determines that the input voltage Vin is equal to or higher than the first threshold voltage Vs1. In other words, the value of the input voltage Vin is equal to or higher than the first threshold voltage Vs1 for the predetermined time, the step-up voltage control part 8 determines that the input voltage Vin is equal to or higher than the first threshold voltage Vs1. On the contrary, when the input voltage Vin is not equal to or lower than the first threshold voltage Vs1 for the predetermined time, the step-up voltage control part 8 determines that the input voltage Vin is lower than the first threshold voltage Vs1.

The predetermined time is not limited and may be set in accordance with the characteristics of an output voltage of the battery 1.

Further, the step-up voltage control part 8 determines that, when the value of the input voltage Vin continues to be lower than the first threshold voltage Vs1 for the predetermined time, the input voltage Vin is lower than the first threshold voltage Vs1.

The step-up voltage control part 8 may determine whether or not the input voltage Vin is equal to or higher than the first threshold voltage Vs1 on the basis of an average value calculated by integrating the input voltage Vin. When the average value becomes equal to or higher than the first threshold voltage Vs1, the step-up voltage control part 8 determines that the input voltage Vin is equal to or higher than the first threshold voltage Vs1.

Further, the step-up voltage control part 8 may determine whether or not the input voltage Vin is lower than the first threshold voltage Vs1 on the basis of an average value calculated by integrating the input voltage Vin. When the average value is lower than the first threshold voltage Vs1, the step-up voltage control part 8 determines that the input voltage Vin is lower than the first threshold voltage Vs1.

Returning to the step S42, when the current I is lower than the first threshold current IS1 (100 A) (step S42, No), the step-up voltage control part 8 compares the input voltage Vin with the second threshold voltage Vs2 (8 V). When the input voltage Vin is higher than the second threshold voltage Vs2 (step S46, No), the step S46 proceeds to the step S44.

When the input voltage Vin is lower than the second threshold voltage Vs2 (8 V) (step S46, Yes), the step-up voltage control part 8 sets the output voltage Vo to a voltage equal to the input voltage Vin (step S47). In other words, the step-up voltage device 10 stops the step-up operation. Therefore, when the current I input to the step-up voltage apparatus is lower than the first threshold current, and the voltage applied to the step-up voltage apparatus is lower than the second threshold voltage, the step-up voltage apparatus stops the step-up operation.

In the step s47 where the output voltage Vo is changed from the rated step-up voltage Vm (20 V) to a voltage equal to the input voltage Vin, as the input voltage Vin is lower than the second threshold voltage Vs2 (8 V), the output voltage Vo is discontinuously switched. When the current I input to the step-up voltage apparatus is lower than the first threshold current, and the voltage applied to the step-up voltage apparatus is lower than the second threshold voltage, the step-up voltage apparatus discontinuously switches the output voltage Vo to a voltage lower than the rated step-up voltage Vm.

In the step S46 where the input voltage Vin and the second threshold voltage Vs2 are compared, after the input voltage Vin has been equal to or higher than the second threshold voltage Vs2 for a predetermined time, the step-up voltage control part 8 determines that the input voltage Vin is equal to or higher than the second threshold voltage Vs2. In other words, when the input voltage Vin has not been equal to or lower than the second threshold voltage Vs2 for the predetermined time, the step-up voltage control part 8 determines that the input voltage Vin is lower than the second threshold voltage Vs2.

The predetermined time is not limited and may be set in accordance with the characteristics of the output voltage of the battery 1.

Further, the step-up voltage control part 8 determines that, when the value of the input voltage Vin continues to be lower than the second threshold voltage Vs2 for the predetermined time, the input voltage Vin is lower than the second threshold voltage Vs2.

Further, the step-up voltage control part 8 may determine whether or not the input voltage Vin is lower than the second threshold voltage Vs2 on the basis of an average value calculated by integrating the input voltage Vin. When the average value is lower than the second threshold voltage Vs2, the step-up voltage control part 8 determines that the input voltage Vin is lower than the second threshold voltage Vs2.

The step-up voltage control part 8 may determine whether or not the input voltage Vin is equal to or higher than the second threshold voltage Vs2 on the basis of an average value calculated by integrating the input voltage Vin. When the average value becomes equal to or higher than the second threshold voltage Vs2, the step-up voltage control part 8 determines that the input voltage Vin is equal to or higher than the second threshold voltage Vs2.

When the output voltage Vo is set in the steps S40 to S47, the step-up voltage control part 8 turns on/off the FETs 5 and 6 in order to output a predetermined output voltage Vo set from the output terminal Out of the step-up voltage device 10 (step S48).

Figure 9A:
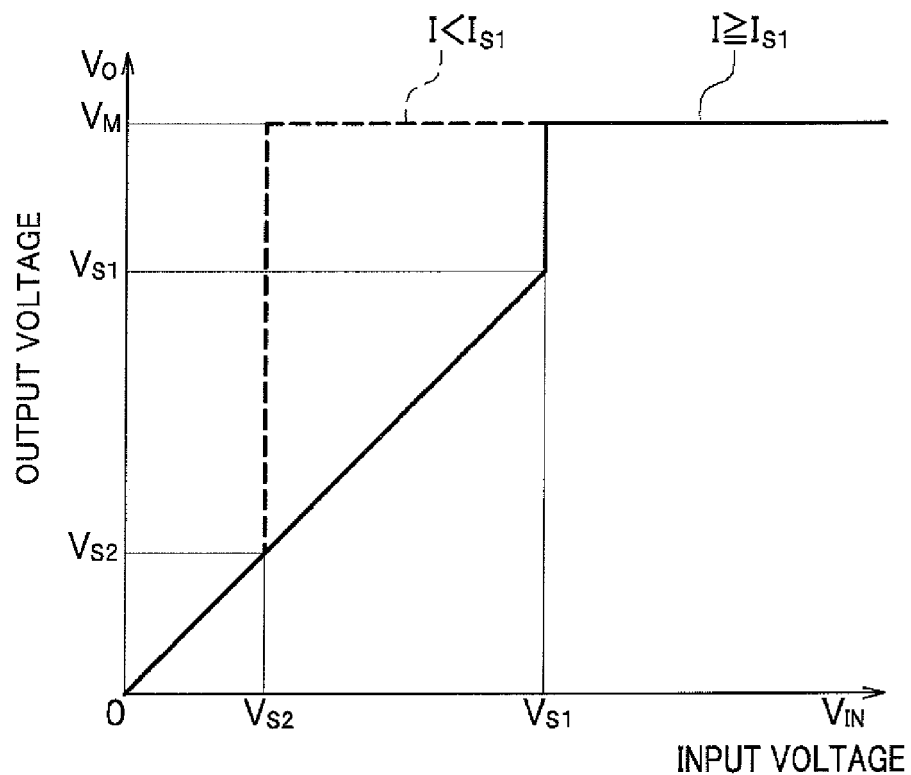
FIG. 9A is a graph showing a relation between an input voltage and an output voltage.
Figure 9B:
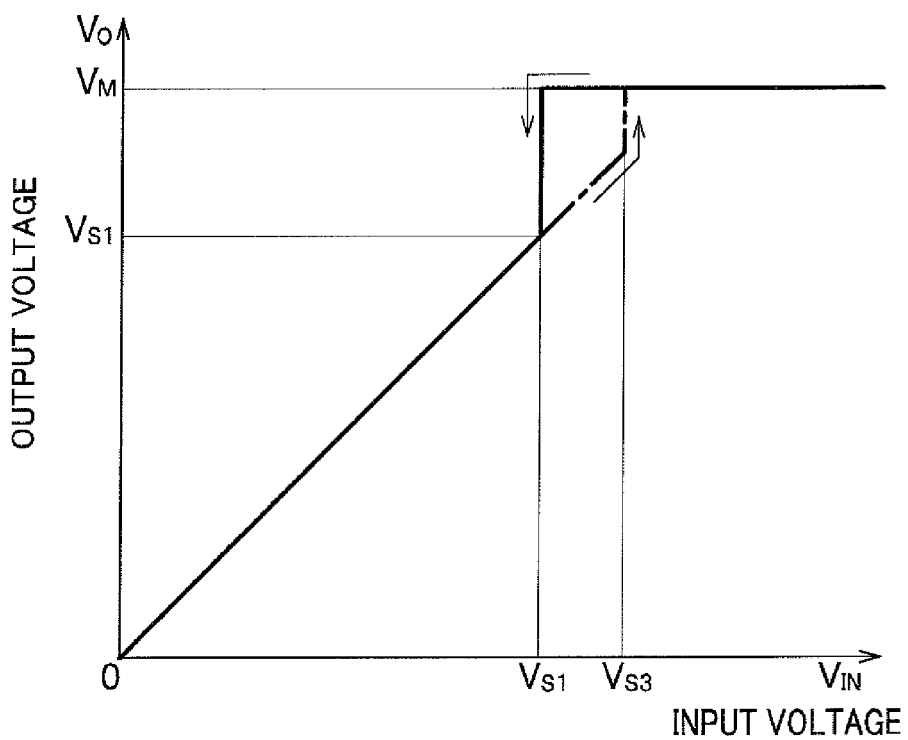
FIG. 9B is a graph showing the step-up operation of the step-up voltage device.

FIGS. 9A and 9B are a graph showing a relation between the input voltage and the output voltage of the step-up voltage device. In FIG. 9A, the current I which is equal to or higher than the first threshold current IS1 (100 A) is shown in a solid line. The current I which is lower than the first threshold current IS1 (100 A) is shown in a dashed line.

As shown in FIG. 9A, when the current I input to the input terminal In of the step-up voltage device 10 (FIG. 1) is equal to or higher than the first threshold current IS1 (100 A), and the input voltage Vin is higher than the first threshold voltage Vs1 (11 V), the step-up voltage device 10 outputs the rated step-up voltage Vm (20 V). When the input voltage Vin is lower than the first threshold voltage Vs1 (11 V), the step-up voltage device 10 outputs an output voltage Vo whose value is equal to the input voltage Vin. In other words, when the input voltage Vin becomes lower than the first threshold voltage Vs1 (11 V), the step-up voltage device 10 discontinuously lowers the output voltage Vo from the rated step-up voltage Vm (20 V).

When the current I input to the input terminal In of the step-up voltage device 10 is equal to or higher than the first threshold current IS1 (100 A), and the input voltage Vin is higher than the second threshold voltage Vs2 (8 V), the step-up voltage device 10 outputs the rated step-up voltage Vm (20 V). When the input voltage Vin is lower than the second threshold voltage Vs2 (8 V), the step-up voltage device 10 outputs the output voltage Vo equal to the input voltage Vin. In other words, when the input voltage Vin becomes lower than the second threshold voltage Vs2 (8 V), the step-up voltage device 10 discontinuously switches an output voltage Vo from the rated step-up voltage Vm (20 V).

In normal states, the voltage Vin output by the battery 1 (FIG. 1) does not fluctuate even if the current I from the battery increases. However, when the function of the battery 1 wears out as a result of long-term use, and the current I output by the battery 1 increases, the voltage Vin output by the battery 1 may decrease.

When a driver turns the steering wheel 23 (FIG. 2) to a full extent with a vehicle stopping, more electric power is drastically required in the motor 30 (FIG. 1). Subsequently, because the step-up voltage device 10 outputs an output electric power Pout as required, the current I input to the input terminal In is drastically increased. In other words, the current I output by the battery 1 is increased, and the voltage Vin output by the battery 1 is drastically decreased.

When the voltage of the battery 1 (FIG. 1) decreases, the voltage Vin input to the input terminal In of the step-up voltage device 10 (FIG. 1) decreases. The step-up voltage device 10 includes the characteristics of increasing an input current in order to output the output voltage Vo. Accordingly, when the current I output by the battery 1 increases, the voltage of the battery 1 further decreases. As a result, the battery 1 is deteriorated due to the internal voltage drop, which affects the other parts of a system device operated on the battery 1 as a source of power.

In the third embodiment, when the current I input to the input terminal In of the step-up voltage device 10 is equal to or higher than the first threshold current IS1 (100 A), and the input voltage Vin (11 V) is lower than the first threshold voltage Vs1, the step-up voltage device 10 outputs the output voltage Vo whose value is equal to the input voltage Vin. In other words, the step-up voltage device 10 stops the step-up voltage operation.

Preferably, the step-up voltage device 10 starts the step-up voltage operation again when the input voltage Vin increases. For example, the input voltage Vin becomes equal to or higher than the first threshold voltage Vs1 (11 V) and the step-up voltage device 10 starts the step-up operation. When the input voltage Vin fluctuates and oscillates in the neighborhood of the first threshold voltage Vs1 (11 V), the step-up voltage device 10 frequently switches the output voltage Vo back and forth in a certain range, and the hunting phenomenon occurs.

In order to prevent the hunting phenomenon, the third threshold voltage VS3 which is higher than the first threshold voltage Vs1 (11 V) is set in advance. When the input voltage Vin becomes equal to or higher than the third threshold voltage VS3, the step-up voltage device 10 starts the step-up voltage operation again. FIG. 9B is a graph showing the restart of step-up operation of the step-up voltage device 10.

As shown in FIG. 9B, when the input voltage Vin becomes lower than the first threshold voltage Vs1 (11 V), the step-up voltage device 10 sets the output voltage Vo to a voltage equal to the input voltage Vin and stops a step-up voltage operation (shown in a solid line in FIG. 9B).

On the other hand, when the input voltage Vin increases and becomes equal to the first threshold voltage Vs1 (11 V), the step-up voltage device 10 does not start the step-up voltage operation. When the input voltage Vin further increases and becomes equal to or higher than the third threshold voltage VS3, the step-up voltage device 10 starts the step-up voltage operation (shown a chain line in FIG. 9B).

As mentioned above, the step-up voltage device 10 sets in advance the first threshold voltage Vs1 at which the step-up operation is stopped, and the third threshold voltage VS3 at which the step-up operation is restarted. Consequently, the hunting phenomenon can be prevented.

The third threshold voltage VS3 is not limited and can be set in consideration of the fluctuation of the output voltage of the battery 1 in a steady state as needed. In the third embodiment, the third threshold voltage VS3 is higher than the first threshold voltage Vs1, but may be lower than the first threshold voltage Vs1.

As mentioned above, when the current I input to the input terminal In of the step-up voltage device 10 is equal to or higher than the first threshold current IS1 (100 A), and the input voltage Vin is lower than the first threshold voltage Vs1 (11 V), the step-up voltage device 10 discontinuously switches an output voltage Vo from the rated step-up voltage Vm, which prevents the current I input to the input terminal In of the step-up voltage device 10 from decreasing drastically. Accordingly, an excellent effect can be made, whereby a load of the battery 1 can be reduced by lowering the current I output by the battery 1.

In the third embodiment, when the current I input to the input terminal In of the step-up voltage device 10 is lower than the first threshold current IS1 (100 A), and the input voltage Vin is lower than the second threshold voltage Vs2 which is lower than the first threshold voltage Vs1 (11 V), the step-up voltage device 10 stops the step-up voltage operation (shown in a dashed line in FIG. 9A).

When an increase in the current I is small, the drop (load) in the voltage of the battery 1 is small as well. Until the input voltage Vin output by the battery 1 becomes equal to the second threshold voltage Vs2 (8 V), the step-up voltage device 10 outputs the rated step-up voltage Vm (20 V) without causing much voltage drop (load) in the battery 1. Therefore, the step-up voltage device 10 can normally drive the control device 20 (FIG. 2) which controls the electric power steering apparatus 100 (FIG. 2), whereby an excellent effect can be made.

What is claimed is:

1. An electric power steering apparatus comprising:
a motor providing a steering force;
a step-up voltage apparatus which steps up an applied voltage output by an electric power supply; and
a drive control apparatus which drives the motor with a target current based on a steering input by using an output voltage of the step-up voltage apparatus, the drive control apparatus including:
a current monitor apparatus which monitors an input current; and
a voltage monitor apparatus which monitors the applied voltage, wherein
the step-up voltage apparatus outputs a rated step-up voltage to drive the motor, and wherein, when the input current to the step-up voltage apparatus is equal to or higher than a first threshold current set in the step-up voltage apparatus, and a voltage applied to the step-up voltage apparatus is lower than a first threshold voltage set in the step-up voltage apparatus, the step-up voltage apparatus discontinuously switches the output voltage to a voltage lower than the rated step-up voltage.

2. The electric power steering apparatus according to claim 1, wherein, when the current input to the step-up voltage apparatus is equal to or higher than the first threshold current, and the voltage applied to the step-up voltage apparatus is lower than the first threshold voltage, the step-up voltage apparatus stops a step-up voltage operation.

3. The electric power steering apparatus according to claim 1, wherein the step-up voltage apparatus sets a predetermined second threshold voltage lower than the first threshold voltage and outputs the rated step-up voltage, when the current input to the step-up voltage apparatus is lower than the first threshold current and the voltage applied to the step-up voltage apparatus is lower than the second threshold voltage, the step-up voltage apparatus discontinuously switches the output voltage to a voltage lower than the rated step-up voltage.

4. The electric power steering apparatus according to claim 3, wherein, when the current input to the step-up voltage apparatus is lower than the first threshold current, and the voltage applied to the step-up voltage apparatus is lower than the second threshold voltage, the step-up voltage apparatus stops the step-up voltage operation.

5. The electric power steering apparatus according to claim 1, wherein the step-up voltage apparatus sets a predetermined second threshold current which is higher than the first threshold current, and wherein, when the current input to the step-up voltage apparatus is equal to or higher than the second threshold current, and the voltage applied to the step-up voltage apparatus is lower than the first threshold voltage, the step-up voltage apparatus stops the step-up voltage operation.

6. The electric power steering apparatus according to claim 1, wherein a hunting phenomenon can be prevented by setting a third threshold voltage.

7. The electric power steering apparatus according to claim 1, wherein, when a detected current is equal to or higher than the first threshold current for a predetermined time, the step-up voltage device determines that the detected current is equal to or higher than the first threshold current.

8. The electric power steering apparatus according to claim 1, wherein, when a detected current is lower than the first threshold current for a predetermined time, the step-up voltage device determines that the detected current is lower than the first threshold current.

9. The electric power steering apparatus according to claim 1, wherein, when a detected voltage is equal to or higher than the first threshold voltage for a predetermined time, the step-up voltage device determines that the detected voltage is equal to or higher than the first threshold voltage.

10. The electric power steering apparatus according to claim 1, wherein, when a detected voltage is lower than the first threshold voltage for a predetermined time, the step-up voltage device determines that the detected voltage is lower than the first threshold voltage.

11. The electric power steering apparatus according to claim 1, wherein the step-up voltage apparatus further includes a step-up voltage control part configured to determine whether or not the input current is equal to or higher than the first threshold current on the basis of an average value calculated by integrating the input current, and wherein, when the average value is equal to or higher than the first threshold current, the step-up voltage control part determines that the input current is equal to or higher than the first threshold current.

12. The electric power steering apparatus according to claim 1, wherein the step-up voltage apparatus further includes a step-up voltage control part configured to determine whether or not the input current is lower than the first threshold current on the basis of an average value calculated by integrating the input current, and wherein, when the average value is lower than the first threshold current, the step-up voltage control part determines that the input current is lower than the first threshold current.

13. The electric power steering apparatus according to claim 1, wherein the step-up voltage apparatus further includes a step-up voltage control part configured to determine whether or not the input voltage is equal to or higher than the first threshold voltage on the basis of an average value calculated by integrating the input voltage, and wherein, when the average value is equal to or higher than the first threshold voltage, the step-up voltage control part determines that the input voltage is equal to or higher than the first threshold voltage.

14. The electric power steering apparatus according to claim 1, wherein the step-up voltage apparatus further includes a step-up voltage control part configured to determine whether or not the input voltage is lower than the first threshold voltage on the basis of an average value calculated by integrating the input voltage, and wherein, when the average value is lower than the first threshold voltage, the step-up voltage control part determines that the input voltage is lower than the first threshold voltage.

* * * * *